United States Patent [19]
Nakatsuka

[11] Patent Number: 6,115,104
[45] Date of Patent: Sep. 5, 2000

[54] IMAGE PROCESSING USING PARAMETERS RELATED TO IMAGE INPUT AND OUTPUT DEVICES

[75] Inventor: Kimihiro Nakatsuka, Kyoto, Japan

[73] Assignee: Dainippon Screen MFG, Co., Ltd., Japan

[21] Appl. No.: 09/145,896

[22] Filed: Sep. 2, 1998

[30]   Foreign Application Priority Data

Sep. 2, 1997  [JP]  Japan ..................................... 9-254175
  Aug. 24, 1998 [JP]  Japan ................................... 10-254624

[51] Int. Cl.[7] ............................. G03B 27/52; G03B 27/00
[52] U.S. Cl. ................................................ 355/40; 355/18
[58] Field of Search ................................... 355/68, 71, 77, 355/41, 18, 27, 40; 382/162, 167

[56]    References Cited

U.S. PATENT DOCUMENTS 5,083,154  1/1992  Terashita et al. ......................... 355/68
5,281,995  1/1994  Terashita et al. ......................... 355/77
5,694,484  12/1997 Cottrell et al. .......................... 382/100
5,835,627  11/1998 Higgins et al. .......................... 382/100

FOREIGN PATENT DOCUMENTS 9-80733  3/1998  Japan .

*Primary Examiner*—Safet Metjahic
*Assistant Examiner*—Hung Henry Nguyen
*Attorney, Agent, or Firm*—Ostrolenk, Faber, Gerb & Soffen, LLP

[57]    ABSTRACT

An image processing control information obtaining unit obtains input characteristic information of an image input unit and output characteristic information of an image output unit. The image processing control information obtaining unit further analyzes the state of an image input from the image input unit (that is, a target image to be processed) and obtains image analysis information. The image processing control information obtaining unit also obtains a requirement of an operator with respect to an image output from the image output unit as intentional information. An image processing parameter approximate reasoning unit approximately reasons at least one image processing parameter with respect to a predetermined image processing operation, based on the various pieces of image processing control information thus obtained. An image processing unit carries out the image processing operation according to the approximately reasoned image processing parameter and outputs the results of the image processing operation as image data to the image output unit. The image output unit prints and outputs the image data generated by the image processing unit as a resulting image. This arrangement enables a variety of image processing operations to be readily performed, in order to improve the quality of the output image.

30 Claims, 20 Drawing Sheets

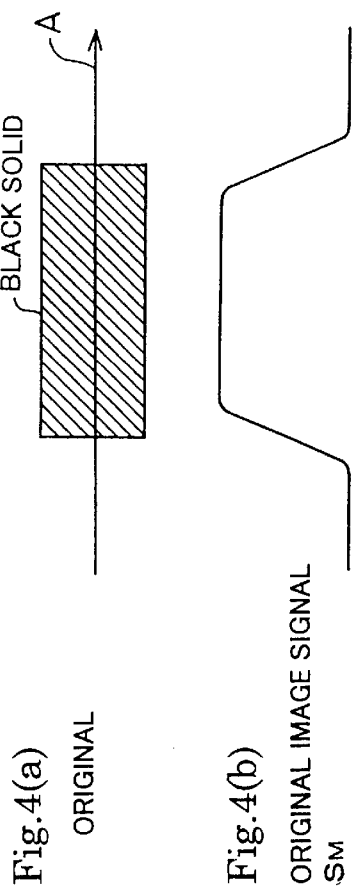
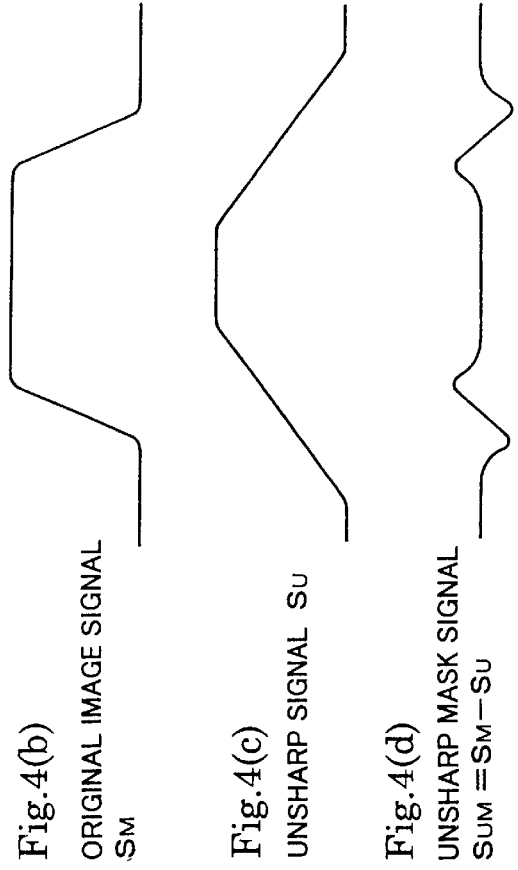
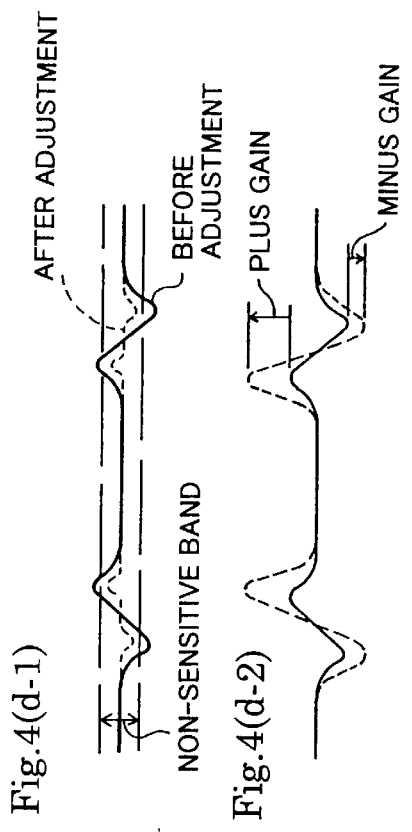

Fig. 8

IMAGE PROCESSING CONTROL INFORMATION
AFFECTING SHARPNESS OF IMAGE

| INPUT CHARACTERISTIC INFORMATION (SCANNER 42) | RESOLUTION :A<br>MTF CHARACTERISTIC VALUE :B |
|---|---|
| OUTPUT CHARACTERISTIC INFORMATION (COLOR PRINTER 54) | RESOLUTION :C |
| INTENTIONAL INFORMATION | INTENTIONAL INFORMATION:<br>D (LEVEL OF 'A LITTLE SHARP') |
| IMAGE ANALYSIS INFORMATION | NOISE LEVEL : G |

Fig. 9(a)

ANTECEDENT        CONSEQUENT

IF   RESOLUTION : ZO   THEN   SHARPNESS GAIN : ZO
IF   RESOLUTION : PS   THEN   SHARPNESS GAIN : NS
.
.
.

Fig. 9(b)

IF   MTF : PM   THEN   SHARPNESS GAIN : PS
IF   MTF : PB   THEN   SHARPNESS GAIN : PM
.
.
.

Fig. 9(c)

IF   RESOLUTION : NS   THEN   SHARPNESS GAIN : NM
.
.
.

Fig. 9(d)

IF   FAVORITE SHARPNESS : ZO   THEN   SHARPNESS GAIN : ZO
IF   FAVORITE SHARPNESS : PS   THEN   SHARPNESS GAIN : PM
.
.
.

Fig. 9(e)

IF   NOISE LEVEL : PB   THEN   SHARPNESS GAIN : NB
.

Fig. 11(a)
MATCHING DEGREE OF RESOLUTION
OF SCANNER 42

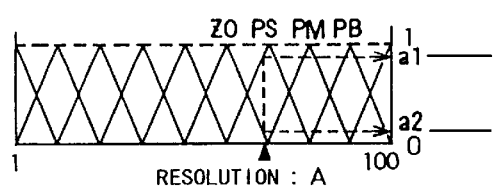

Fig. 11(b)
MATCHING DEGREE OF MTF
CHARACTERISTIC VALUE OF SCANNER 42

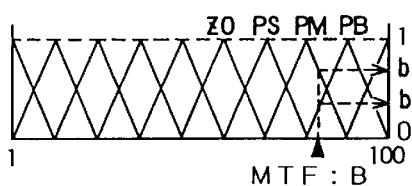

Fig. 11(c)
MATCHING DEGREE OF RESOLUTION
OF COLOR PRINTER 52

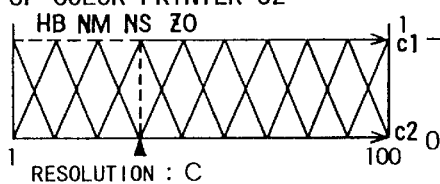

Fig. 11(d)
MATCHING DEGREE OF INTENTIONAL
INFORMATION OF OPERATOR

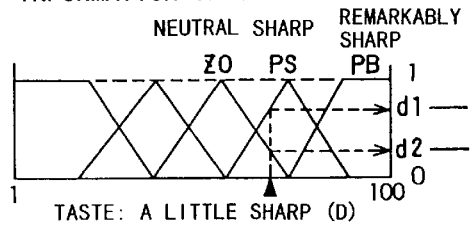

Fig. 11(e)
MATCHING DEGREE OF IMAGE ANALYSIS
INFORMATION (NOISE LEVEL)

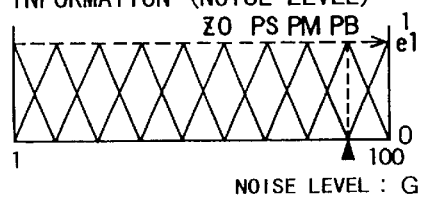

Fig. 11(f)
RESULTS OF APPROXIMATE REASONING WITH
RESPECT TO RESOLUTION OF SCANNER 42

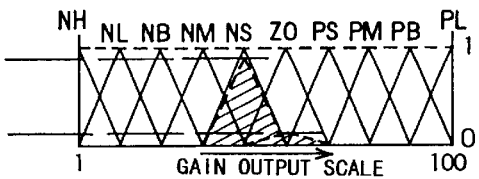

Fig. 11(g)
RESULTS OF APPROXIMATE REASONING WITH
RESPECT TO MTF CHARACTERISTICS OF
SCANNER 42

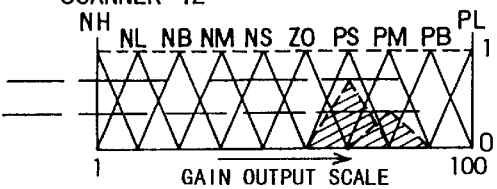

Fig. 11(h)
RESULTS OF APPROXIMATE REASONING WITH
RESPECT TO RESOLUTION OF COLOR PRINTER52

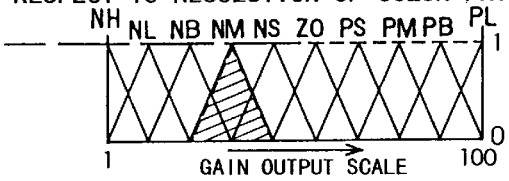

Fig. 11(i)
RESULTS OF APPROXIMATE REASONING WITH
RESPECT TO INTENTIONAL INFORMATION OF
OPERATOR

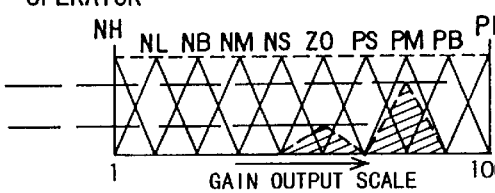

Fig. 11(j) RESULTS OF APPROXIMATE
REASONING WITH RESPECT TO IMAGE
ANALYSIS INFORMATION (NOISE LEVEL)

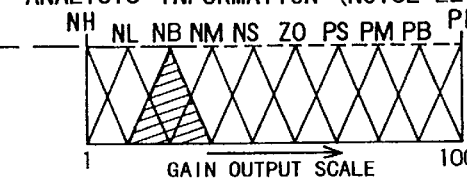

Fig. 11(K)
FINAL RESULT OF
APPROXIMATE REASONING
FOR SHARPNESS GAIN

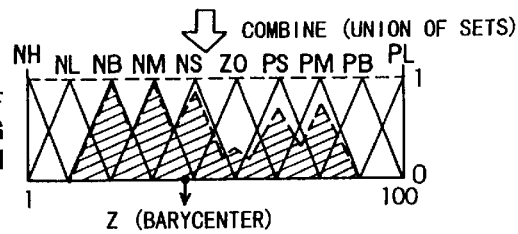

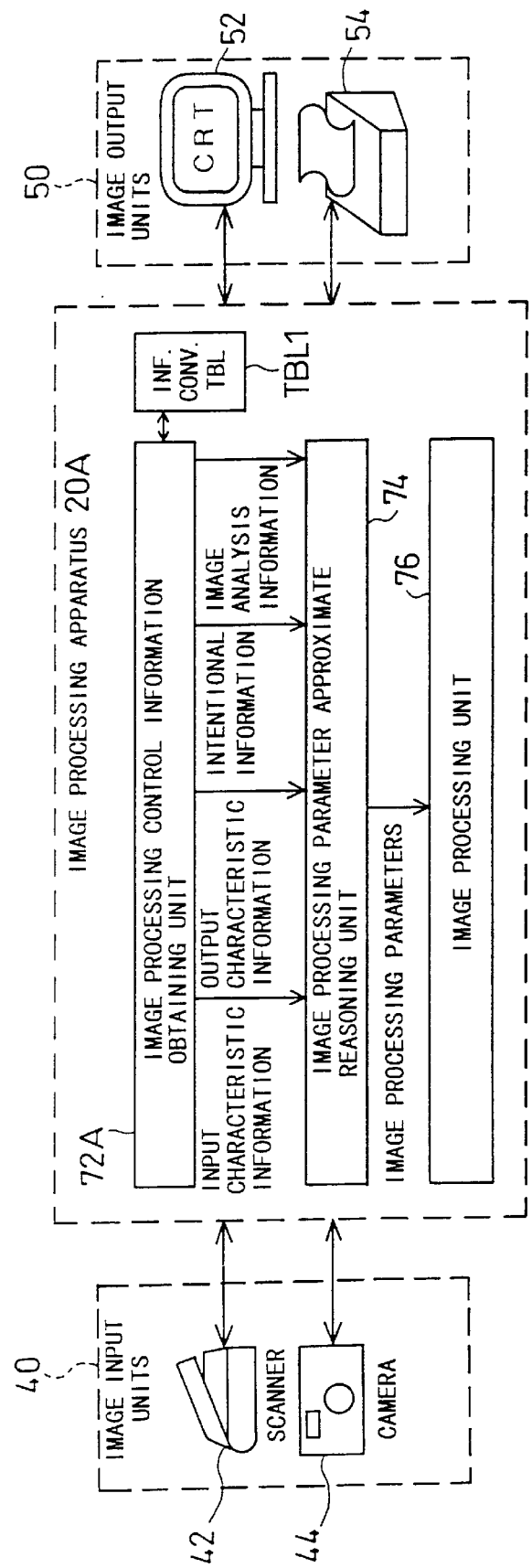

Fig. 14

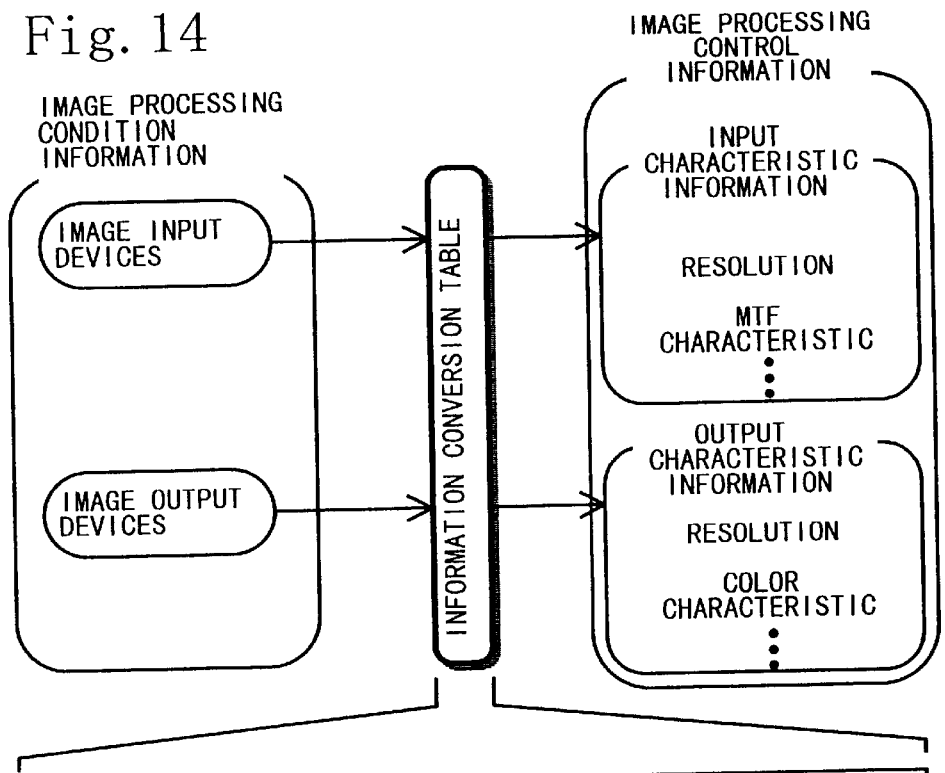

| IMAGE PROCESSING CONDITION INFORMATION | IMAGE PROCESSING CONTROL INFORMATION | |
|---|---|---|
| | INPUT/OUTPUT CHARACTERISTIC INFORMATION | INFORMATION VALUES (MAGNITUDE) |
| IMAGE INPUT DEVICE A1 | RESOLUTION | x 1 |
| | MTF CHARACTERISTIC | x 2 |
| | ⋮ | ⋮ |
| IMAGE INPUT DEVICE A2 | RESOLUTION | x 3 |
| | SCAN MAGNIFICATION | x 4 |
| | ⋮ | ⋮ |
| ⋮ | ⋮ | ⋮ |
| IMAGE OUTPUT DEVICE B1 | RESOLUTION | x 5 |
| | TONE REPRODUCIBILITY | x 6 |
| | ⋮ | ⋮ |
| IMAGE OUTPUT DEVICE B2 | RESOLUTION | x 7 |
| | COLOR CHARACTERISTIC | x 8 |
| | ⋮ | ⋮ |
| ⋮ | ⋮ | ⋮ |

Fig. 18

| IMAGE PROCESSING CONDITION INFORMATION | IMAGE PROCESSING CONTROL INFORMATION ||
| --- | --- | --- |
| | IMAGE QUALITY CHARACTERISTIC INFORMATION | INFORMATION VALUES (MAGNITUDE) |
| DIGITAL CAMERA N1 | INTENSITY | 40 |
| | SMOOTHNESS | 70 |
| DYE SUBLIMATION PRINTER N2 | INTENSITY | 60 |
| | TEXTURE | 30 |
| SUBJECT 'PORTRAIT' | INTENSITY | 30 |
| | TEXTURE | 50 |
| | SMOOTHNESS | 65 |

Fig. 19(a)

```
IF   'INTENSITY' : NM   THEN   'GAIN' : NM
IF   'INTENSITY' : NS   THEN   'GAIN' : NS
IF   'INTENSITY' : ZO   THEN   'GAIN' : ZO
IF   'INTENSITY' : PS   THEN   'GAIN' : PS
                          .
                          .
```

Fig. 19(b)

```
IF   'TEXTURE' : NM   THEN   'MASK SIZE' : NM
IF   'TEXTURE' : NS   THEN   'MASK SIZE' : NS
IF   'TEXTURE' : ZO   THEN   'MASK SIZE' : ZO
                          .
                          .
```

Fig. 19(c)

```
IF  'SMOOTHNESS' : PS   THEN   'GRAININESS' : PS
IF  'SMOOTHNESS' : PM   THEN   'GRAININESS' : PM
                          .
                          .
```

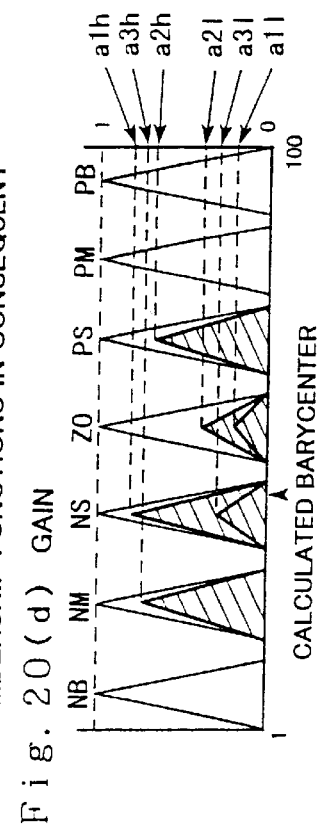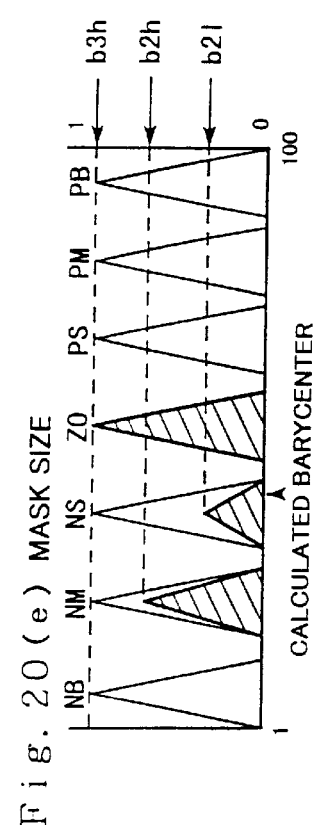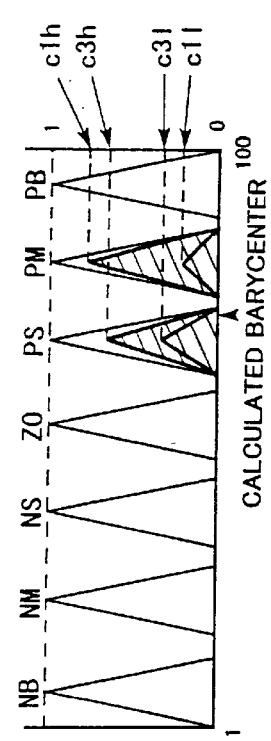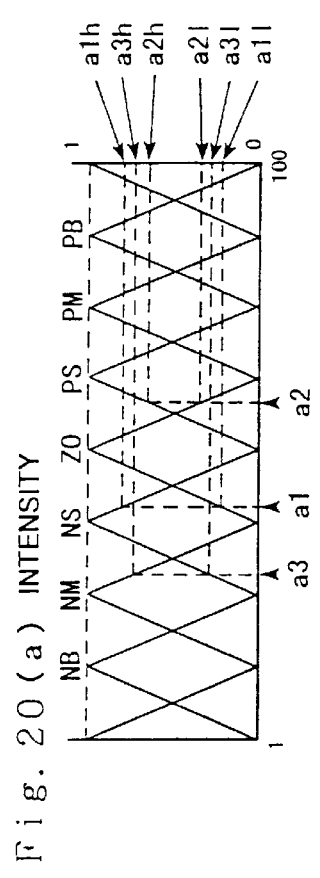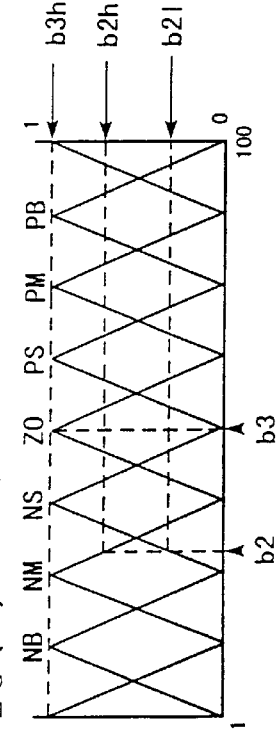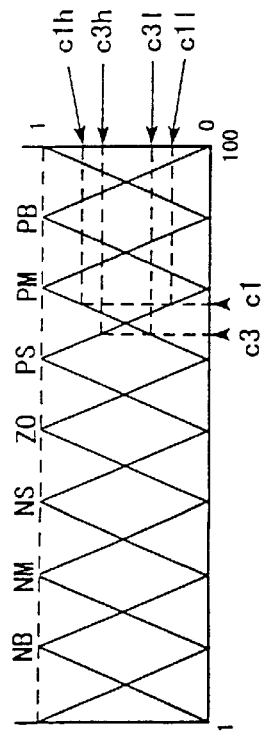

IMAGE PROCESSING USING PARAMETERS RELATED TO IMAGE INPUT AND OUTPUT DEVICES

BACKGROUND OF THE INVENTION

1. Field of the Invention

The present invention relates to an image processing technique that is performed when image data obtained by a variety of image input units are output to a variety of image output units. More specifically the invention pertains to a technique of carrying out a variety of image processing operations required to improve the quality of output images.

2. Description of the Related Art

When image data obtained by an image input unit, such as a scanner, are output to an image output unit, such as a color printer, a variety of image processing operations including noise reduction, color conversion, tone change, size alteration, sharpness enhancement, and smoothing are generally performed to improve the quality of an output image.

In order to obtain the desired image quality, it is required for a skilled operator in the field of image processing operations to adjust image processing parameters, repeating the trial and error based on the operator's own experiences. The image quality depends on the type of devices, i.e., the image input unit and the image output unit the output media, such as plain paper and regenerated paper, and the application of the image, such as posters and leaflets. It is required for the operator to adjust the image processing parameters based on each of the varying factors. The conventional image processing operators accordingly require both experience and time.

SUMMARY OF THE INVENTION

Accordingly, an object of the present invention is to carry out image processing operations required to improve the quality of an output image when image data obtained by one of a variety of image input devices are output to one of a variety of image output devices.

At least part of the above and other related objects is attained by a first method of processing image data of an input image obtained by an arbitrarily selected image input device, in order to enable an output image generated by an arbitrarily selected image output device to have a desired image quality. The first method includes the steps of: (a) obtaining input characteristic information and output characteristic information as image processing control information to determine at least one image processing parameter used in the image processing to attain the desired image quality, the input characteristic information being characteristic of the image input device and affecting quality of the input image, the output characteristic information being characteristic of the image output device and affecting quality of the output image; (b) determining the at least one image processing parameter based on the image processing control information; and (c) processing the image data of the input image according to the at least one image processing parameter, so as to generate the output image having the desired image quality.

The first image processing method automatically determines an appropriate image processing parameter, based on the image processing control information (input characteristic information and output characteristic information) which is characteristic of the image input device and the image output device and affects the image quality, so as to enable the output image to be subjected to the appropriate image processing and thereby have the desired image quality. This method readily carries out the image processing required for improving the quality of the output image, in the process of outputting the image data obtained by the image input device to the image output device.

In accordance with one preferable application, the step (a) comprises the step of obtaining statistical information of the input image as one piece of the image processing control information.

The statistical information of the input image is, for example, image quality information on the input image, such as the noise level or the tone histogram. The image processing method of this arrangement automatically specifies an appropriate image processing parameter based on the image processing control information characteristics of the image input device and the image output device as well as the image quality information of the input image, so as to enable the resulting output image to have the desired image quality. This method allows output of a desired image processed by the appropriate image processing operations.

The step (a) may include the step of obtaining specified information as one piece of the image processing control information, the specified information representing a requirement of an operator with respect to the desired image quality.

The information specified by the operator represents a requirement of the operator regarding the output image generated by the image output device, for example, a requirement for the image quality or a requirement for the finishing state. The method of this preferable arrangement automatically specifies an appropriate image processing parameter based on the image processing control information characteristic of an image input device and an image output device and the image quality information of the input image as well as the information specified by the operator, so as to enable the resulting output image to have the desired image quality. This method allows output of a desired image processed by the appropriate image processing operations.

In accordance with one preferred embodiment, the first image processing method may further include the step of providing preference information for a plurality of operators, each piece of the preference information representing a deviation of the specified information with respect to each of the plurality of operators from a reference image quality. The step (a) may include the step of obtaining the preference information as one piece of the image processing control information according to the specification of an operator who currently processes the image.

This arrangement effectively prevents variation of output image quality due to differences in the tastes among the respective operators.

In accordance with another preferred embodiment, the step (b) may comprise the step of determining the at least one image parameter based on the image processing control information using fuzzy logic.

Fuzzy logic is used to determine a compromise among the results of several approximations using a plurality of pieces of image processing control information with respect to one image processing parameter. The fuzzy logic readily takes advantage of ambiguous information given in a perceivable form of expression, such as the information specified by the operator, as the condition of approximation.

The present invention is also directed to a first image processing apparatus that processes image data of an input image obtained by an arbitrarily selected image input device, in order to enable an output image generated by an arbitrarily selected image output device to have a desired image quality. The first image processing apparatus comprises an image processing control information obtaining unit that obtains input characteristic information and output characteristic information as image processing control information to determine at least one image processing parameter used in the image processing to attain the desired image quality, the input characteristic information being characteristic of the image input device and affecting quality of the input image, the output characteristic information being characteristic of the image output device and affecting quality of the output image; an image processing parameter determining unit that determines the at least one image processing parameter based on the image processing control information; and an image processing unit that processes the image data of the input image according to the at least one image processing parameter, so as to generate the output image having the desired image quality.

The present invention is further directed to a first computer program product for processing image data of an input image obtained by an arbitrarily selected image input device, in order to enable an output image generated by an arbitrarily selected image output device to have a desired image quality. The first computer program product includes a computer readable medium; a first program code unit that causes a computer to obtain input characteristic information and output characteristic information as image processing control information to determine at least one processing parameter used in image processing to attain the desired image quality, the input characteristic information being characteristic of the image input device and affecting quality of input image, the output characteristic information being characteristic of the image output device and affecting quality of the output image; a second program code unit that causes the computer to determine the at least one image processing parameter based on the image processing control information; and a third program code unit that causes the computer to process the image data of the input image according to the at least one image processing parameter, so as to generate the output image having the desired image quality, wherein each of the program code units is recorded on the computer readable medium.

The present invention is also directed to a second method of processing image data of an input image obtained by an arbitrarily selected image input device, in order to enable an output image generated by an arbitrarily selected image output device to have a desired image quality. The second method includes the steps of (a) providing an information conversion table that converts image processing condition information into image processing control information, the image processing condition information affecting the desired image quality, the image processing control information being used to determine at least one image processing parameter required for image processing to attain the desired image quality; (b) obtaining at least one piece of the image processing condition information and converting the at least one piece of the image processing condition information into at least one piece of the image processing control information; (c) determining the at least one image processing parameter based on the image processing control information; and (d) processing the image data of the input image according to the at least one image processing parameter, so as to generate the output image having the desired image quality.

The second image processing method enables the image processing control information corresponding to the input image processing condition information to be readily obtained from the image conversion table. Like the first image processing method, the second image processing method automatically determines an appropriate image processing parameter based on the image processing control information obtained in the above manner; so as to enable the output image to be subjected to the appropriate image processing and thereby have the desired image quality. Specifically, the second method readily carries out the image processing required for improving the quality of the output image, in the process of outputting the image data obtained by the image input device to the image output device.

It is preferable that the image processing condition information includes at least one of information representing the image input device; information representing the image output device; information representing an output medium; information representing a use of the output image; and information representing an object included in the image.

It is also preferable that the image processing control information includes at least one of input characteristic information and output characteristic information, the input characteristic information being characteristic of the image input device and affecting quality of the input image, the output characteristic information being characteristic of the image output device and affecting quality of the output image.

This arrangement enables the image processing control information corresponding to the image processing condition information to be readily read from the information conversion table. By way of example, when the information representing the image input device is obtained as the image processing condition information, the input characteristic information, which is characteristic of the image input device, is easily obtained from the information conversion table.

It is preferable that the image processing control information includes image quality characteristic information that represents the image quality of an output image related to the image processing parameter.

The image quality characteristic information may include at least one of information regarding vividness of the output image; information regarding sharpness of the output image; information regarding smoothness of the output image; information regarding texture of the output image; information regarding contrast of the output image; and information regarding tint of the output image.

In the case where the image quality characteristic information is obtained as the image processing control information, different pieces of image processing condition information can be converted to a common piece of image quality characteristic information, which represents the image quality, by the information conversion table. Compared with the case where the information characteristic of each piece of image processing information, this structure effectively reduces the variations of the image processing control information.

The present information is further directed to a second image processing apparatus that processes image data of an input image obtained by an arbitrarily selected image input device, in order to enable an output image generated by an arbitrarily selected image output device to have a desired image quality. The second image processing apparatus includes an information conversion table that converts image processing condition information into image processing control information, the image processing condition information affecting the desired image quality, the image processing control information being used to determine at least one image processing parameter required for image processing to attain the desired image quality; an image processing control information obtaining unit that obtains at least one piece of the image processing condition information and converts the at least one piece of the image processing condition information into at least one piece of the image processing control information; an image processing parameter determining unit that determines the at least one image processing parameter based on the image processing control information; and an image processing unit that processes the image data of the image data of the input image according to the at least one image processing parameter, so as to generate the output image having the desired image quality.

The present invention is also directed to a second computer program product for processing image data of an input image obtained by an arbitrarily selected image input device, in order to enable an output image generated by an arbitrarily selected image output device to have a desired image quality. The second computer program product includes: a computer readable medium; a first program code unit that causes a computer to provide an information conversion table that converts image processing condition information into image processing control information, the image processing condition information affecting the desired image quality, the image processing control information being used to determine at least one image processing parameter required for image processing to attain the desired image quality; a second program code unit that causes the computer to obtain at least one piece of the image processing condition information and converting the at least one piece of the image processing condition information into at least one piece of the image processing control information; a third program code unit that causes the computer to determine the at least one image processing parameter based on the image processing control information; and a fourth program code unit that causes the computer to process the image data of the input image according to the at least one image processing parameter, so as to generate the output image having the desired image quality, wherein each of the program code units is recorded on the computer readable medium.

The present invention also includes other applications. One possible application is a program supply device that supplies computer programs, which cause a computer to realize the functions of the respective steps or the respective units of the present invention, to the computer via a communication path. In this application, programs are generally registered in a server included in a network. Required programs are downloaded to the computer via the communication path and executed by the computer to realize the above method or image processing apparatus of the present invention.

These and other objects, features, aspects, and advantages of the present invention will become more apparent from the following detailed description of the preferred embodiment with the accompanying drawings.

BRIEF DESCRIPTION OF THE DRAWINGS

FIGS. 4(a) through 4(e), 4(c-1), 4(d-1) and 4(d-2) show the details of a sharpness enhancement operation;

FIG. 8 shows an example of image processing control information that affects the sharpness of the image in the first embodiment;

FIGS. 9(a) through 9(e) show examples of the fuzzy logic steps applied to approximate the sharpness gain, which is one of the image processing parameters in the sharpness enhancement operation of the first embodiment;

FIGS. 11(a) through 11(k) show examples of the fuzzy logic in the first embodiment;

FIG. 13 is a block diagram illustrating the functional structure of another image processing apparatus as a second embodiment of the present invention;

FIG. 14 shows how an image processing control information obtaining unit 72A obtains input characteristic information and output characteristic information as image processing control information;

FIG. 18 shows examples of image processing condition information and the image quality characteristic information as the image processing control information representing the sharpness of the image;

FIGS. 19(a) through 19(c) show examples of the fuzzy logic steps relating to the image processing parameters used in the sharpness enhancement operation of the third embodiment;

FIGS. 20(a) through 20(f) show examples of the fuzzy logic in the third embodiment.

DESCRIPTION OF THE PREFERRED EMBODIMENT

One mode of carrying out the present invention is described below as a preferred embodiment.

A First Embodiment

Figure 1:
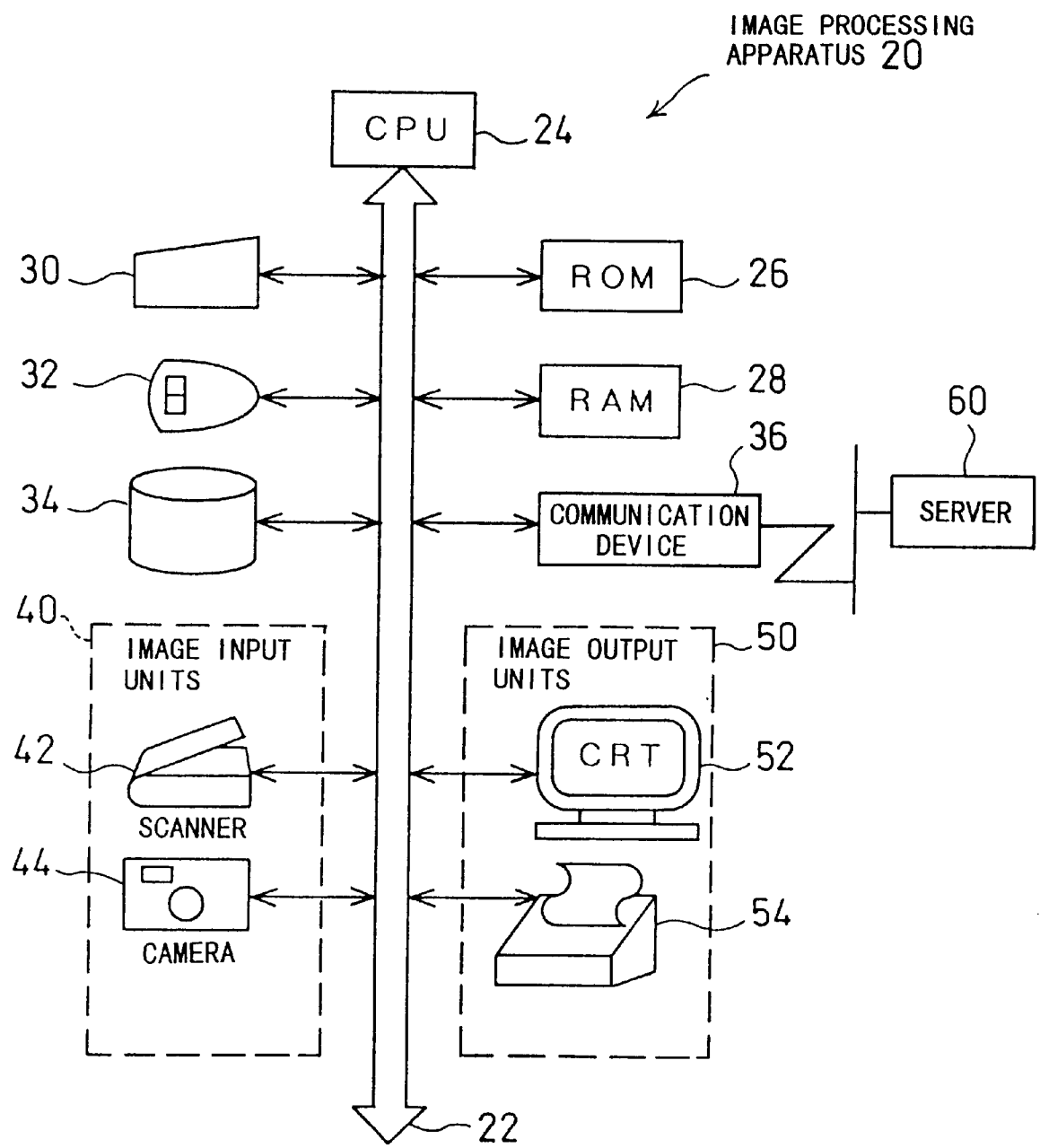
FIG. 1 is a block diagram illustrating the structure of an image processing apparatus as a first embodiment of the present invention.

A-1. Structure of Image Processing Apparatus FIG. 1 is a block diagram illustrating the structure of an image processing apparatus embodying the present invention. The image processing apparatus 20 includes a CPU 24, a ROM 26, a RAM 28, a keyboard 30 and a mouse 32 as input means through which an operator inputs data and information, and an external storage device or a hard disk drive 34, all of which are interconnected via a bus 22. The image processing apparatus 20 further includes a scanner 42 and a camera 44 as image input units 40. The scanner 42 and the camera 44 are only examples of the image input unit 40, and the image input unit 40 may be any unit that receives an image and outputs computer readable data. The image processing apparatus 20 also includes a CRT 52 and a color printer 54 as image output units 50. The CRT 52 and the color printer 54 are also only examples of the image output unit 50, and the image output unit 50 may be any unit the receives data from the computer and outputs the input data as an image. The image processing apparatus 20 generally includes a floppy disk drive and a CD-ROM drive as well as the hard disk drive 34 as the external storage devices. A communication device 36 is connected to an external network including a server 60 via a communication path. The server 60 has a function as a program supply device that supplies computer programs to the computer via the communication path. An interface circuit for connecting the respective elements with the bus 22 is provided in the invention but not shown in FIG. 1. The computer executes computer programs previously stored in the ROM 26 and computer programs loaded into the RAM 28 from an external storage device such as the hard disk drive 34, in order to work as the image processing apparatus.

Figure 2:
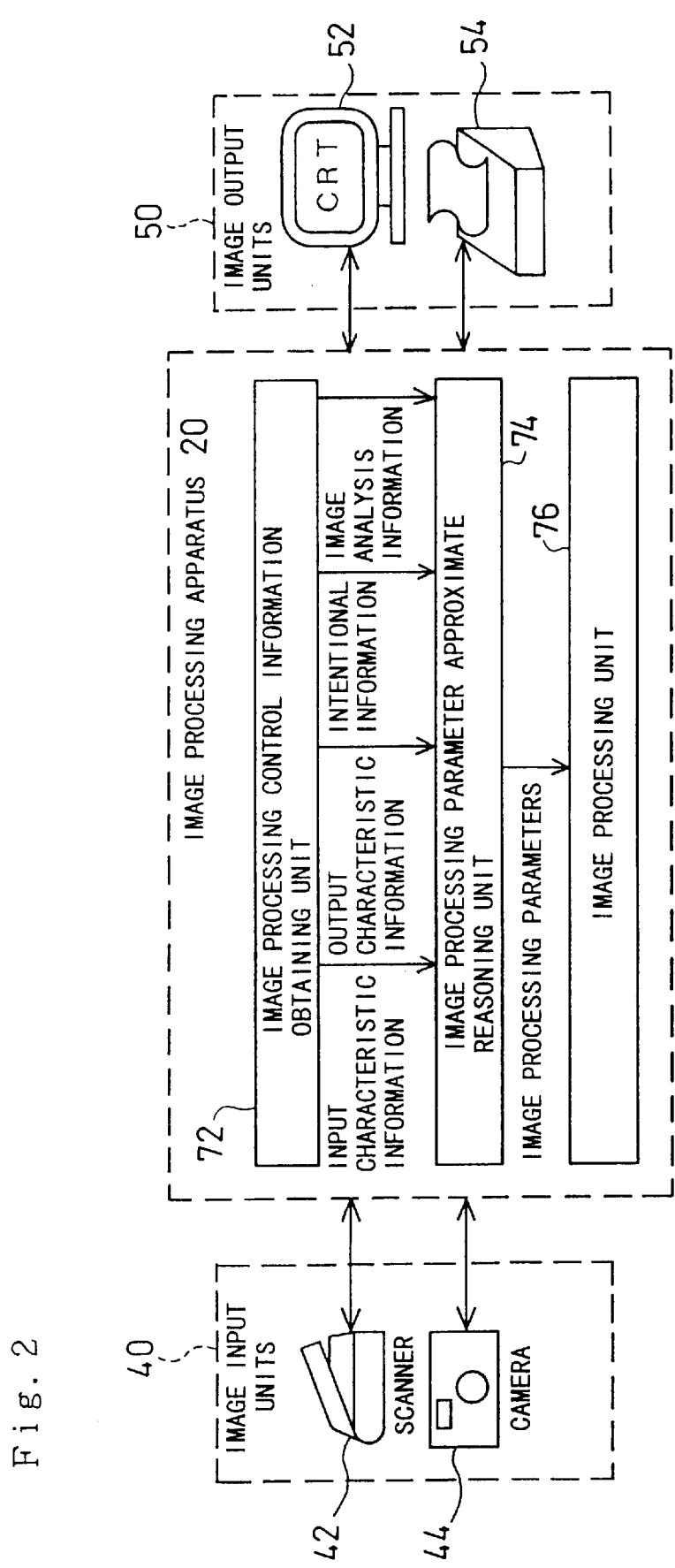
FIG. 2 is a block diagram illustrating the functional structure of the image processing apparatus of the first embodiment.

FIG. 2 is a block diagram illustrating the functional structure of the image processing apparatus of the embodiment. When the image processing apparatus 20 of the embodiment performs image processing, the CPU 24 (see FIG. 1) executes the variety of programs to embody an image processing control information obtaining unit 72, an image processing parameter approximating unit 74, and an image processing unit 76 successively in the course of the processing.

The computer programs implementing the respective functions may be recorded in a computer readable recording medium, such as a flexible disk or a CD-ROM. The computer reads the computer programs from the recording medium and transfers the input computer programs to the internal storage device or the external storage device. Alternatively, the computer programs may be supplied to the computer via the communication path. The microprocessor of the computer executes the computer programs stored in the internal storage device in order to realize the respective functions. The computer may directly read and execute the computer programs recorded on the recording medium.

As used in the present disclosure, a computer is a concept including both hardware and an operating system, or more concretely, implies the hardware working under the control of the operating system. In a case in which the operating system is not required and in which an application program itself activates the hardware, the hardware itself corresponds to the computer. The hardware includes at least a microprocessor, such as a CPU, and means for reading the computer programs recorded on the recording medium. The computer program includes program codes to realize the functions of the respective units. Part of these functions may be realized by the operating system, instead of the application program.

Available examples of the 'recording medium' of the present invention include floppy disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

A-2. Outline of Processing

A concrete procedure of image processing of this embodiment is described based on the assumption that the scanner 42 is used as the image input unit 40 (see FIG. 2) for inputting an image and the color printer 54 is used as the image output unit 50 for outputting an image.

Figure 3:
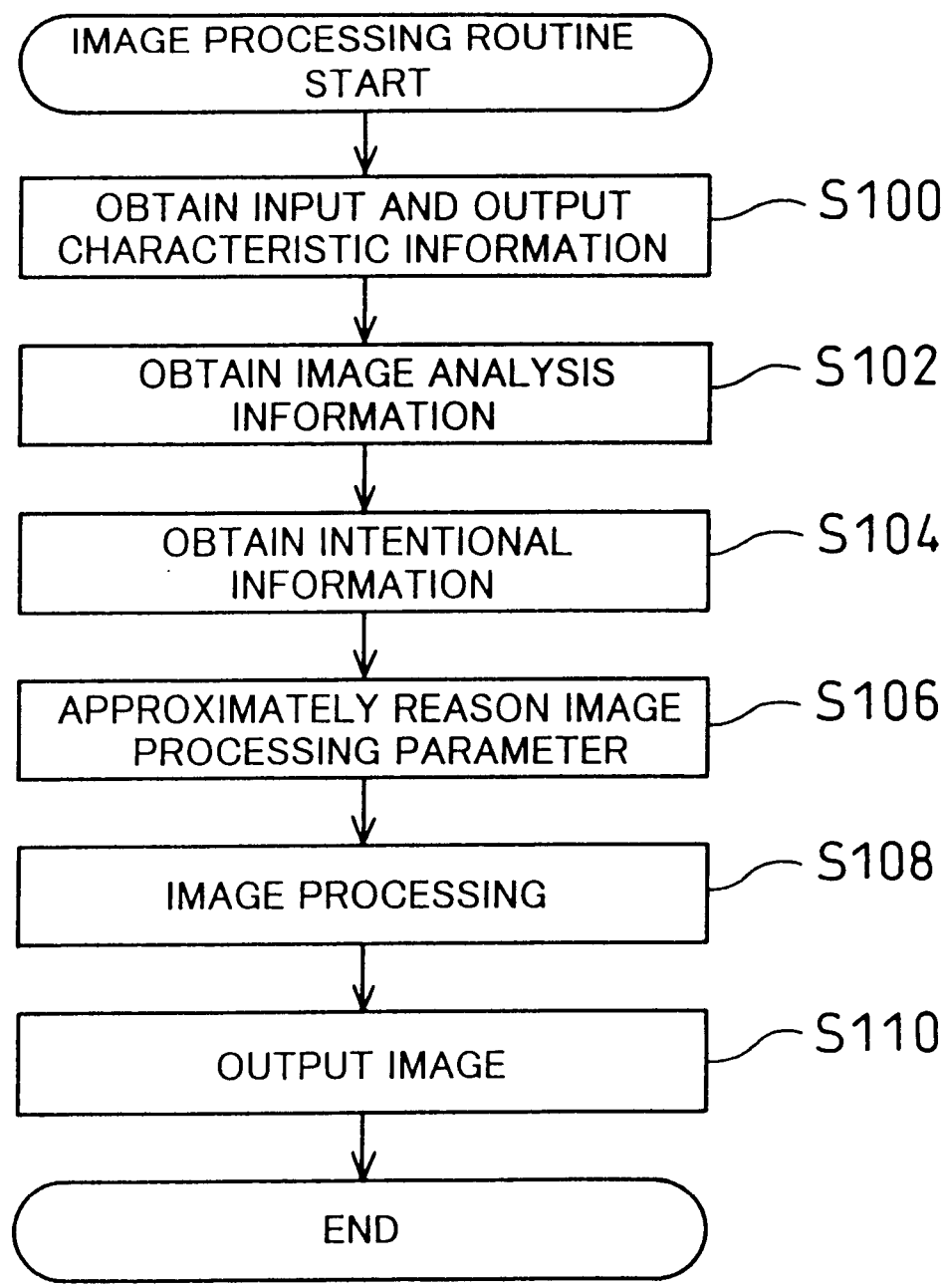
FIG. 3 is a flowchart showing the outline of an image processing routine executed in the first embodiment.

FIG. 3 is a flowchart showing outline of the image processing routine in the first embodiment. At steps S100 through S104, the image processing control information obtaining unit 72 (see FIG. 2) obtains various pieces of image processing control information. At step S100, the image processing control information obtaining unit obtains input characteristic information that is characteristic of the image input unit 40 (for example, the scanner 42) and output characteristic information that is characteristic of the image output unit 50 (for example, the color printer 54). The details of the characteristic information will be discussed later. Here, the expression 'information is obtained' means that required information is obtained according to any one of various processes, for example, the process of directly inputting information through the operation of the input means, such as the keyboard 30, by the user and the process of reading the information stored in the image input unit, the image output unit, or another constituent according to the requirements. Unless otherwise specified, the term 'obtaining' hereinafter means obtaining required information by any one of these methods.

At step S102, the state of the input image read by the image input unit 40 (the scanner 42) (that is, a target image to be processed) is analyzed to obtain image analysis information, which will be discussed later. At step S104, requirements of an operator or a client with respect to the image output from the output unit 50 (the color printer 54) (that is, requirements on a resulting image) are obtained as specified information. At subsequent step S106, the image processing parameter approximating unit 74 (see FIG. 2) approximates an image processing parameter used for a predetermined image processing operation, based on the various pieces of image processing control information obtained in steps S100 through S104. At step S108, the image processing unit 76 (see FIG. 2) processes the image with the image processing parameter approximated at step S106, and outputs the resulting data to the output unit 50 (the color printer 54). At step S110, the output unit 50 (the color printer 54) prints the image data output from the image processing unit 76 as a resulting image.

Typical examples of the image processing operations affecting the quality of the output images include sharpness enhancement and tone change. The sharpness enhancement operation enhances the boundary of an image to increase the sharpness of the image. FIG. 4 shows the details of the sharpness enhancement operation. Scanning an original shown in FIG. 4(a) with the scanner 42 in the direction of arrow A gives an original image signal SM shown in FIG. 4(b). The original image signal SM is averaged to give an indistinct signal SU shown in FIG. 4(c). An indistinct mask signal SUM shown in FIG. 4(d) is obtained by subtracting the indistinct signal SU from the original image signal SM. An enhanced image signal SM' shown in FIG. 4(e) is obtained by adding the indistinct mask signal SUM to the original image signal SM.

A one-dimensional or a two-dimensional mask (averaging filter) is used for the averaging process to obtain the unsharp signal SU shown in FIG. 4(c). The size of the averaging mask is one parameter with respect to the sharpness enhancement. FIG. 4(c-1) shows a variation in indistinct signal SU corresponding to a variation in size of the averaging mask. An increase in the size of the mask makes the slope of the indistinct signal SU gentler, whereas a decrease in the size of the mask makes the slope of the indistinct signal SU steeper.

Figure 5:
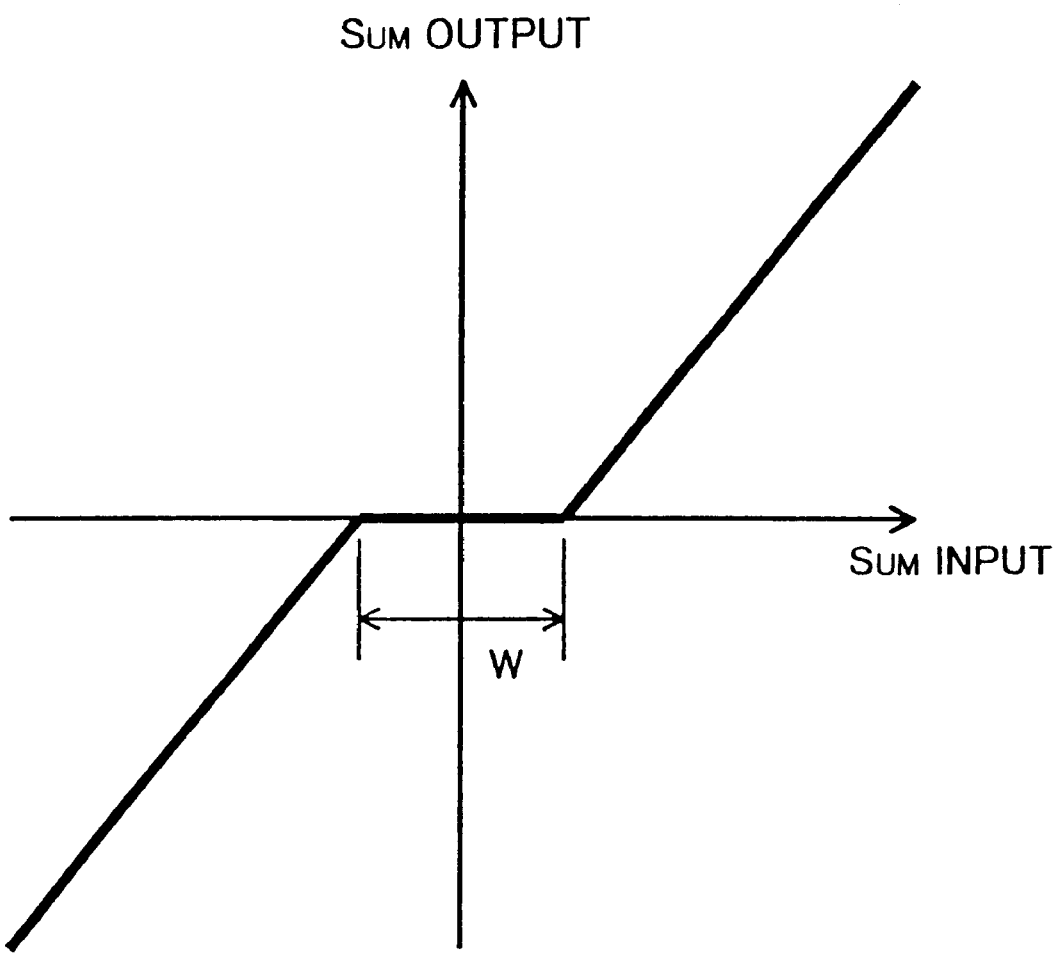
FIG. 5 is a graph showing the graininess characteristic.

The gain and the graininess for specifying an indistinct mask signal SUM shown in FIG. 4(d) are also the parameters of the sharpness enhancement. FIG. 4(d-1) shows a variation in the indistinct mask signal SUM before and after the adjustment of the graininess. The term 'graininess' denotes granularity and is one image processing parameter that is adjusted to eliminate the minute roughness of an image to enhance the surface smoothness. A distinguishable adjustment of the graininess cancels signal values in a non-sensitive band W, where the absolute value of the indistinct mask signal SUM is not greater than a predetermined value, as shown in the graph of FIG. 5, so as to eliminate the small noises as shown in FIG. 4(d-1). The smoothness accordingly increases with an increase in range of the non-sensitive band W. The curve of FIG. 4(d) shows the indistinct mask signal SUM without the graininess adjustment.

The graph of FIG. 4(d-2) shows the indistinct mask signal SUM with variations in the gain thereof (hereinafter may be referred to as the sharpness gain).

Figure 6:
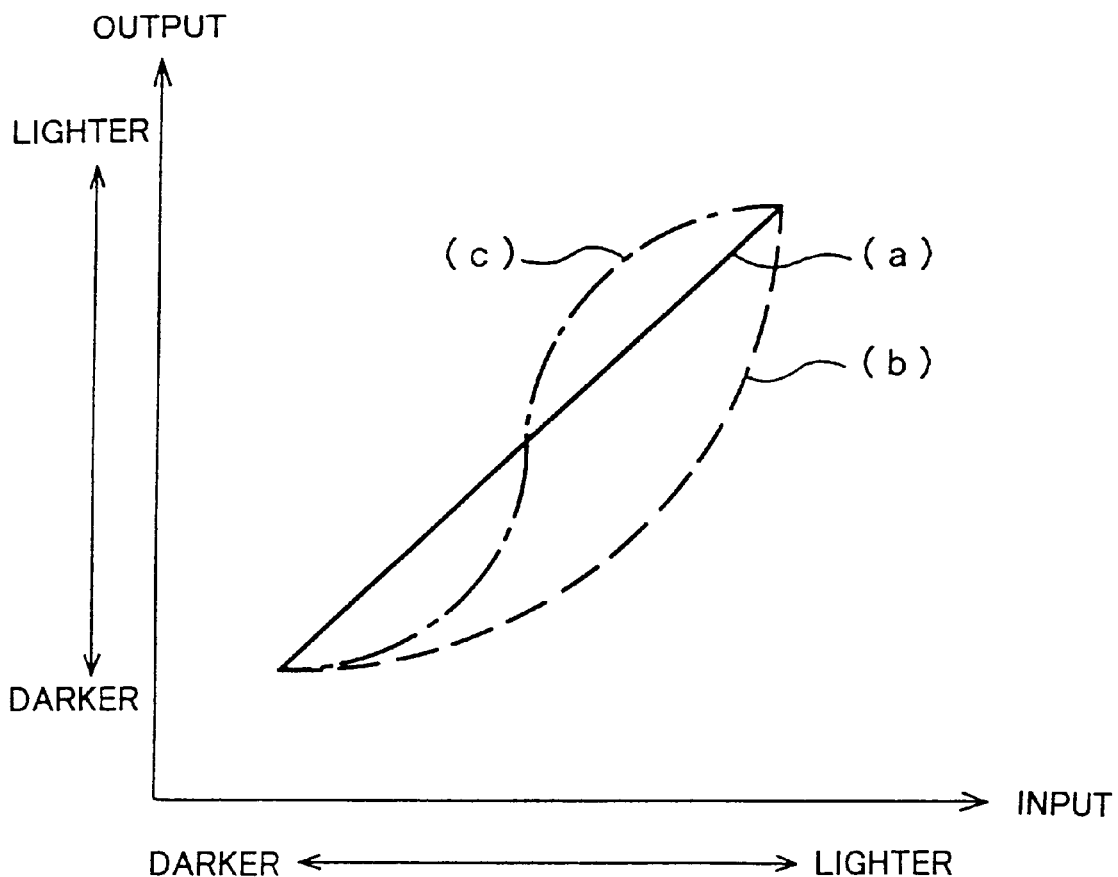
FIG. 6 is a graph showing the tone characteristic.

FIG. 6 is a graph showing a tone change. The tone represents the grade of lightness of the image. In a normal image processing, there is a linear relationship between the variation in lightness of an output image and the variation in lightness of an input image as shown by a curve (a). The tone change operation changes the linear relationship to a non-linear relationship as shown by a curve (b) or a curve (c), and thereby emphasizes either the lighter section or the darker section.

The following describes the details of the respective processing steps in the flowchart of FIG. 3.

A-3. Detailed Process of Obtaining Image Processing Control Information

The image processing control information of the variety of image input units 40 and image output units 50 connectable with the image processing apparatus 20, that is, the input characteristic information and the output characteristic information, are stored in advance in a storage device such as the hard disk drive 34. By way of example, pieces of characteristic information are stored corresponding to each trade name or model of known commercially available scanners, digital camera, printers, and CRTs. In the flowchart of FIG. 3, at step S100, the image processing control information obtaining unit 72 reads the image processing control information of the image input unit 40 and the image output unit 50 in use, for example, the input characteristic information of the scanner 42 and the output characteristic information of the color printer 54, from the hard disk drive 34.

The input characteristic information of the image input unit 40 (the scanner 42) and the output characteristic information of the image output unit (the color printer 54) include a plurality of pieces of characteristic information (parameters) that determine the image quality in the image input unit 40 and the image output unit. In the case of the image input unit 40, the characteristic information includes the type of light-receiving elements, for example, photomultipliers or charge-coupled devices (CCD), the resolution, the magnification, the MTF characteristics, the noise characteristics, the tone reproducibility, and the color characteristics. In the case of the image output unit 50, the characteristic information includes the type of output format, for example, ink jet, sublimation transfer, electrophotography, or chemical exposure of silver salt; the resolution; the format of tone reproduction, for example, halftone dot, dither, error diffusion, or continuous tone; the tone reproducibility; and the color characteristics. The resolution and the MTF characteristics of the image input unit and the resolution of the image output unit are examples of the characteristic information that affects the sharpness of the image. The accuracy of data and the tone reproducibility are examples of the characteristic information that affects the tone change.

When an image in input from the image input unit 40 (the scanner 42), the image processing control information obtaining unit 72 analyzes the input image and obtains the result of the analysis as image analysis information at step S102. The image analysis information includes statistical information of the input image, such as the noise level and the tone histogram that represents the frequency of each tone in the whole or a part of the image plane.

Figure 7A:
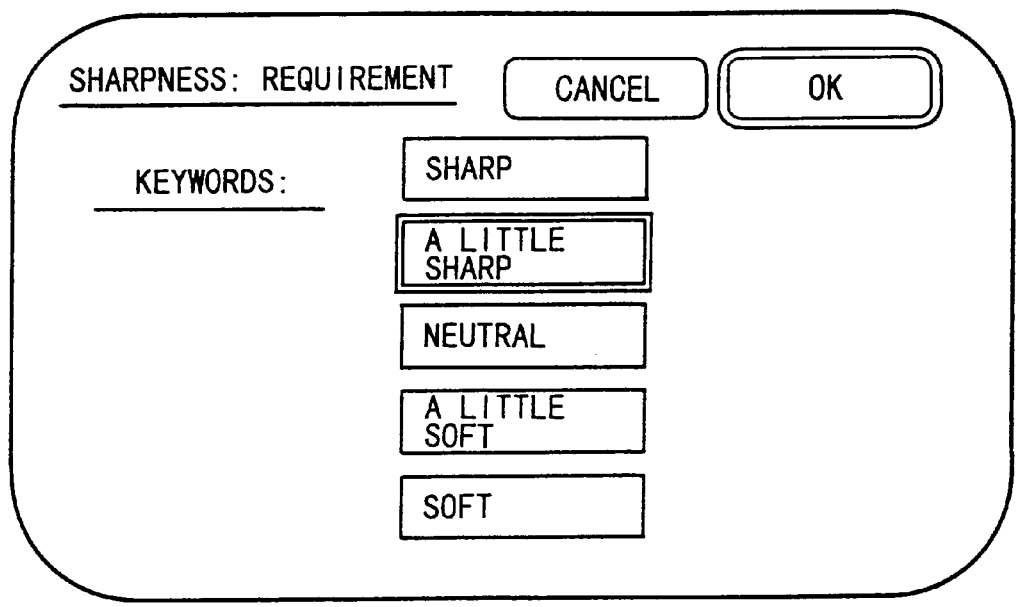
FIGS. 7(a) and 7(b) show exemplified windows for setting specified information.
Figure 7B:
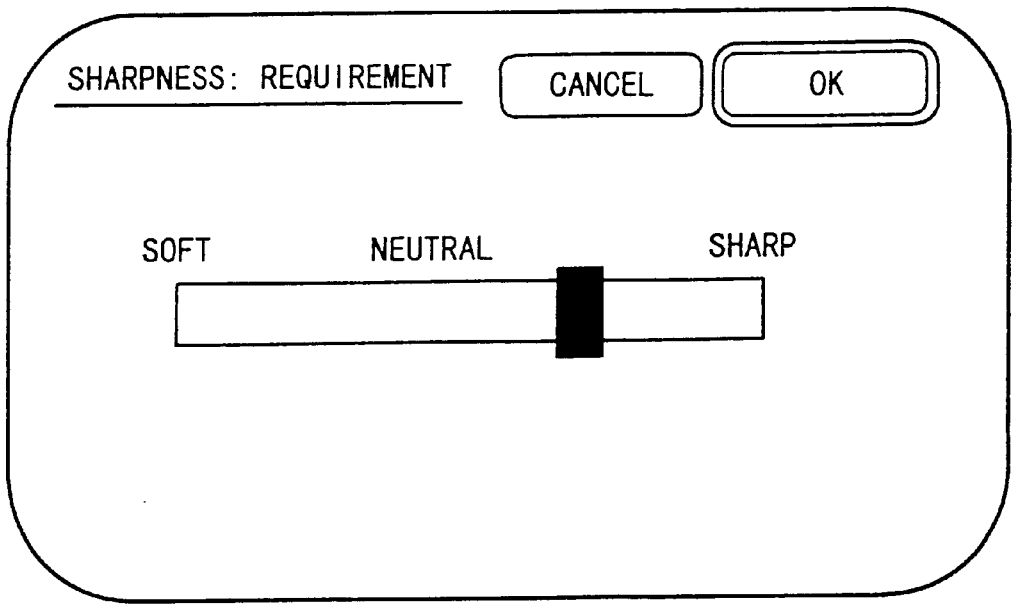

At subsequent step S104, the image processing control information obtaining unit 72 obtains information specified by the operator. The specified information represents a requirement of the operator with respect to the quality of the image output from the image output unit 50 (the color printer 54) and is given in a perceivable form of expression. The perceivable form of expression is given, as, for example, "stereoscopic," "sharp," or "quiet." The inputted information is, for example, keyword information like 'set the sharpness of the image to a low level of sharpness' or 'impart quietness to the resulting image'. FIGS. 7(a) and 7(b) show exemplified windows for setting information. The operator can set the specified information in the window of a graphical user interface (GUI) by selecting a keyword through operation of the keyboard 30 or the mouse 32 (see FIG. 1) as shown in FIG. 7(a) or adjusting the position of a sharpness slider displayed in the window through operation of the keyboard 30 or the mouse 32, as shown in FIG. 7(b).

A-4. Approximation of Image Processing Parameter

At step S106, the image processing parameter approximating unit 74 (see FIG. 2) approximates an image processing parameter based on the various pieces of image processing control information obtained in steps S100 through 104. One example of an approximating procedure selects one of the maximum value, the mean value, and the minimum value of one image processing parameter based on the various pieces of image processing control information that affect the image processing parameter. Another example procedure uses fuzzy logic. Any method may be used as long as it can approximate an image processing parameter based on the various pieces of image processing control information obtained.

The following describes a process for determining the sharpness gain as the image processing parameter, which is one of the image processing parameters in the sharpness enhancement operation, using fuzzy logic. FIG. 8 shows an example of image processing control information that affects the sharpness of the image. The following description is based on the assumption that the image processing control information specified in FIG. 8 is obtained in steps S100 through S104 of FIG. 3. The input characteristic information relating to the scanner 42 selected as the image input unit 40 includes the resolution of A [dpi] (for example, 600 dpi) and the MTF characteristic value of B (for example, 0.8 at a spatial frequency of 30 cycles/mm). The output characteristic information relating to the color printer 54 selected as the image output unit 50 includes the resolution of C [dpi] (for example, 300 dpi). The information specified by the operator or the client is D, representing the level of 'slightly sharp'. The noise level, which is included in the image analysis information of the input image, is G [%] (for example, 80%).

The following three conditions are set as prerequisites to performing the fuzzy logic. The first condition is to define the fuzzy rules for the respective image processing operations with respect to each piece of image processing control information. By way of example, a certain piece of image processing control information regarding the image input unit is to be variable in the image processing operations. While the image output unit is fixed, the values of the image processing parameter required to output reference image processing results are specified for each of the various image input units. The results are statistically processed to determine the fuzzy rules empirically. FIGS. 9(a) through 9(e) show examples of the fuzzy rules applied to approximate reason the sharpness gain, which is one of the image processing parameters in the sharpness enhancement operation.

FIG. 9(a) shows an example of the fuzzy rules with respect to the resolution of the image input unit. FIG. 9(b) shows an example of the fuzzy rules with respect to the MTF characteristic value of the image input unit. FIG. 9(c) shows an example of the fuzzy rules with respect to the resolution of the image output unit. FIG. 9(d) shows an example of the fuzzy rules with respect to the information specified by the operator regarding the sharpness. FIG. 9(e) shows an example of the fuzzy rules with respect to the noise level, which is one of the image analysis information.

These fuzzy rules are written in the form of 'fuzzy if-then rules', where the portion between 'if' and 'then' is called an antecedent and the portion after 'then' is called a consequent. By way of example, the first rule shown in FIG. 9(a) means that 'if the resolution of the image input unit is included in a fuzzy set ZO (antecedent), then set the sharpness gain to the fuzzy set ZO (consequent)'. The fuzzy set ZO is a vague set having some allowable range, such as that the resolution of the image input unit is 'medium'. Each fuzzy set is generally expressed by a symbol, such as NL, NB, NM, NS, ZO, PS, PM, PB, or PL. While the fuzzy set ZO is specified as a reference (medium), the fuzzy set PS represents 'a little greater than the reference', the fuzzy set PM 'moderately greater than the reference', and the fuzzy set PB 'remarkably greater than the reference'. The fuzzy set NS represent 'a little smaller than the reference', the fuzzy set NM 'moderately smaller than the reference', and the fuzzy set NB 'remarkably smaller than the reference'. Although simple rules are shown in the example of FIG. 9 for clarity of explanation, the fuzzy rules are determined empirically according to the circumstances in the actual application.

The second condition is to define membership functions representing the relationship between the fuzzy sets and various pieces of image processing control information in the antecedents of the fuzzy rules as shown in FIGS. 11(a), 11(c), 11(d), and 11(e) discussed later. The third condition is to define membership functions representing the relationship between the fuzzy sets and various pieces of image processing control information in the consequents of the fuzzy rules as shown in FIGS. 11(f), 11(g), 11(h), 11(i), 11(l), and 11(k).

Figure 10:
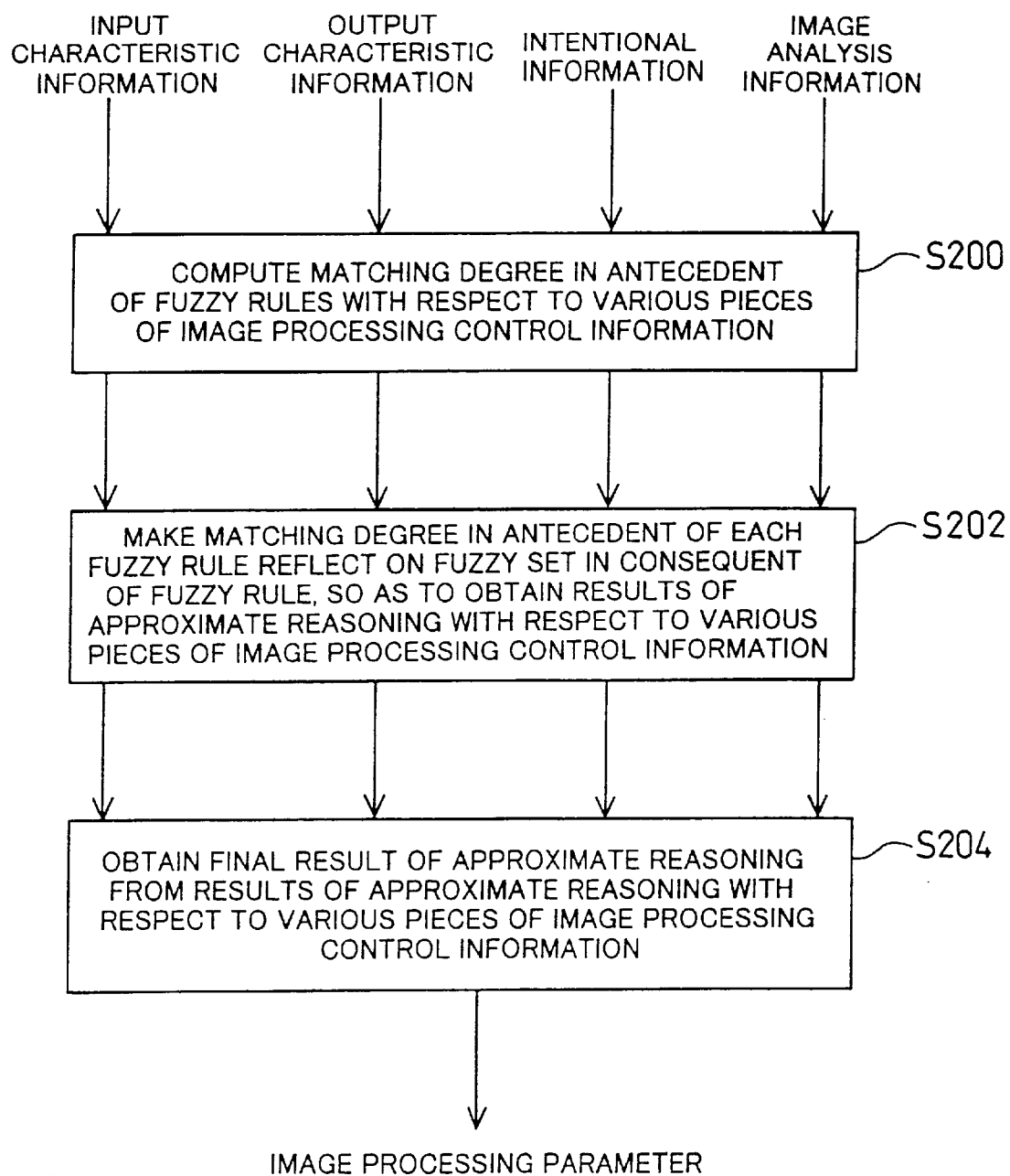
FIG. 10 is a flowchart showing the outline of a fuzzy logic routine.

Following the above three conditions, the image processing parameter approximating unit 74 (see FIG. 2) approximates an image processing parameter according to fuzzy logic. FIG. 10 is a flowchart showing an outline of a fuzzy logic routine, and FIGS. 11(a) through 11(k) show examples of the fuzzy logic. The abscissa of FIGS. 11(a) through 11(k) indicates either a piece of image processing control information or an image processing parameter (in these examples, the sharpness gain) in the normalized scale, whereas the ordinate indicates the compatibility or the membership value.

At step S200 of FIG. 10, membership values in the antecedents of the respective fuzzy rules are computed with respect to various pieces of image processing control information (input characteristic information, output characteristic information, intentional information, and image analysis information). By way of example, membership values corresponding to the value A[dpi] set as the resolution of the scanner 42 (FIG. 9(a)) are computed by the membership function in the antecedent with respect to the resolution of the image input unit as shown in FIG. 11(a). In the example shown in FIG. 11(a), a membership value a1 in the fuzzy set PS and a membership value a2 in the fuzzy set ZO are given corresponding to the value A[dpi] set as the resolution of the scanner 42. The first membership value a1 indicates the probability that the resolution A[dpi] is included in the fuzzy set PS, that is, the matching degree of the resolution A with the fuzzy set PS. The second membership value a2 indicates the probability that the resolution A[dpi] is included in the fuzzy set ZO. In a similar manner, two membership values b1 and b2 corresponding to the MTF characteristic value B of the scanner 42 (FIG. 9(b)) are computed by the membership function in the antecedent with respect to the MTF characteristics of the image input unit as shown in FIG. 11(b). Two membership values c1 and c2 corresponding to the value C[dpi] set as the resolution of the color printer 54 (FIG. 9(c)) are computed by the membership function in the antecedent with respect to the resolution of the image output unit as shown in FIG. 11(c). Two membership values d1 and d2 corresponding to the value D of the information specified by the operator regarding the sharpness (FIG. 9(d)) are computed by the membership function in the antecedent with respect to the information specified by the operator as shown in FIG. 11(d). One membership value e1 corresponding to the noise level G (FIG. 9(e)) is computed by the membership function in the antecedent with respect to the noise level, which is one of the image analysis information of the input image, as shown in FIG. 11(e).

At step S202 of FIG. 10, approximation results are obtained with respect to each piece of the image processing control information, based on the membership values and the fuzzy rules for the piece of image processing control information obtained at step S200. Approximation results are shown as fuzzy sets on the membership functions in the consequents, based on the membership values computed by the membership functions in the antecedents. By way of example, FIG. 11(f) shows the approximation results with respect to the resolution of the scanner 42, which are based on the membership values a1 and a2 obtained in FIG. 11(a) and the fuzzy rules shown in FIG. 9(a). The approximation results are shown by the shapes drawn by the broken lines and filled with the slant lines in FIG. 11(f). These shapes have apexes at the height of the given membership values and are contracted in the direction of the height of the fuzzy sets NS and ZO, which are drawn by the solid lines and specified by the consequents of the fuzzy rules shown in FIG. 9(a). Another method may be applied to express the approximation results of the membership functions in the consequents. For example, the fuzzy set may be truncated at the height of the membership value. In a similar manner, FIG. 11(g) shows the approximation results with respect to the MTF characteristics of the scanner 42. FIG. 11(h) shows the approximation results with respect to the resolution of the color printer 54. FIG. 11(i) shows the approximation results with respect to the information specified by the operator regarding the desired sharpness. FIG. 11(j) shows the approximation results with respect to the noise level, which is included in the image analysis information.

At subsequent step S204, a final approximation result is determined from the approximation results with respect to the various pieces of the image processing control information. By way of example, the process of step S204 combines the respective approximation results with respect to the same image processing parameter for each image processing control information with one another, obtains a union of the fuzzy sets by combining the maximum of the results and computes the barycenter of the union of the fuzzy sets as shown in FIG. 11(k). In this case, the barycenter is calculated as:

$$Z(\text{barycenter}) = \int y \cdot m(y) dy / \int m(y) dy \quad (1)$$

where m(y) denotes a membership function and y denotes a membership value.

The value on the abscissa corresponding to the barycenter Z, that is, the value of the sharpness gain, is read as the final result of approximate reasoning. The image processing unit 76 (see FIG. 2) then carries out the image processing operation with the value of the sharpness gain obtained as the final approximation result at step S108 in the flowchart of FIG. 3. The resulting image with the desired sharpness enhancement is finally output from the color printer 54 (see FIG. 2) at step S110 in the flowchart of FIG. 3. The final approximation result may be the maximum or the minimum of the union of the fuzzy sets, instead of the barycenter.

As described above, approximation of the image processing parameter used in the image processing operation enables the resulting value of the image processing parameter to be a compromise among the values of the image processing parameter obtained for the various pieces of image processing control information. This leads to the appropriate image processing operation. Approximation of the image processing parameters based on the various pieces of image processing control information (input characteristic information, output characteristic information, specified information, and image analysis information) allows even an unskilled operator who is unfamiliar with the process of setting the image processing parameters to carry out the appropriate image processing simply by specifying information about the finished output image as specified information. This arrangement thus facilitates output of a desired image.

Figure 12:
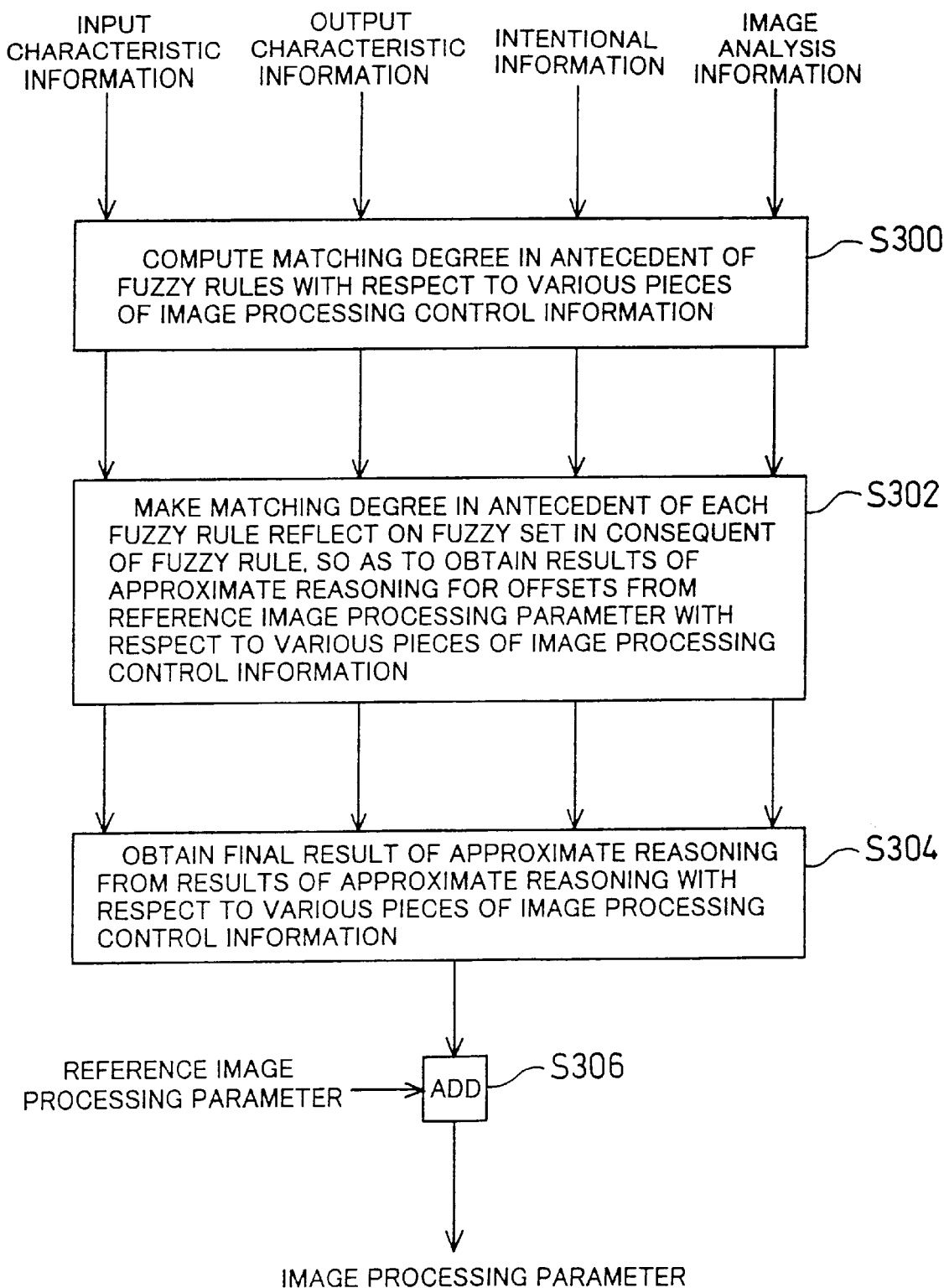
FIG. 12 is a flowchart showing the outline of another fuzzy logic routine.

FIG. 12 is a flowchart showing an outline of another fuzzy logic routine. The procedure of FIG. 12 specifies an image processing parameter used as a reference (reference image processing parameter), and approximates offsets or deviations of the values of the image processing parameter from the reference image processing parameter. Whereas the values of the image processing parameter are directly obtained as the approximation results with respect to the various pieces of image processing information at step S202 of FIG. 10, the deviations of the values of the image processing parameter from the reference image processing parameter are obtained as the approximation results with respect to the various pieces of image processing information at step S302. Whereas the image processing parameter is obtained as the final approximation result at step S204 of FIG. 10, the resulting offset or the resulting deviation of the image processing parameter from the reference image processing parameter is obtained as the final approximation result at step S304. At step S306, the resulting offset is added to the reference image processing parameter to yield the image processing parameter used in the image processing operation. In this case, the abscissa of the defined membership function in the consequent gives a relative value to the reference image processing parameter (that is, an offset). The processing of steps S300 through S304 is similar to the processing of steps S200 through S204 of FIG. 10. This modified arrangement adds the effect of the image processing control information relating to the image input unit and the image output unit to the reference image processing parameter and enables the standard image processing operation to be carried out without any information specified by the operator or the client. The operator can output and check a standard image at any time. After checking the image, the contents of the image processing to be changed from the output image are then input as the information specified by the operator. The operator again carries out the image processing operation and checks the results of the image processing, so as to obtain a desired image.

B. Second Embodiment

B-1. Structure of Image Processing Apparatus

FIG. 13 is a block diagram illustrating the functional structure of another image processing apparatus as a second embodiment. The image processing apparatus 20A of the second embodiment has a similar structure to that of the image processing apparatus 20 of the first embodiment shown in FIGS. 1 and 2. The various computer programs cause the CPU 24 (see FIG. 1) to function as an image processing control information obtaining unit 72A, the image processing parameter approximating unit 74, and the image processing control unit 76 in the course of the respective processing stages.

The difference between the first and second embodiments is that the image processing apparatus 20A has an information conversion table TBL1 and obtains the image processing control information according to this information conversion table TBL1. Here, the image processing control information includes the input characteristic information that is characteristic of the image input unit and the output characteristic information that is characteristic of the image output unit.

B-2. Process of Obtaining Image Processing Control Information

FIG. 14 shows how the image processing control information obtaining unit 72A obtains input characteristic information and output characteristic information as image processing control information. The information conversion table TBL1 stores image processing condition information, for example, the names of available image input devices (the image input unit) and available image output devices (the image output unit), as well as the input characteristic information and output characteristic information (that is, the image processing control information), which are respectively characteristic of the available image input devices and image output devices. The information conversion table TBL1 is stored, for example, in the RAM 28 or the hard disk 34 shown in FIG. 1.

The user specifies an image input device and an image output device, for example, through the operation of the keyboard 30, when setting up or starting the image processing apparatus 20A. When the program enters the image processing routine, the image processing control information obtaining unit 72A obtains the names of the image input device and the image output device specified by the user as the image processing control information at step S100 in the flowchart of FIG. 3. The information conversion table TBL1 outputs the input characteristic information and the output characteristic information corresponding to the image processing control information thus obtained.

Like the first embodiment, the arrangement of the second embodiment enables the image processing parameters to be approximated, based on the input characteristic information and the output characteristic information obtained as the image processing control information. The arrangement of the second embodiment simply requires a user to provide simple initial information, such as the types of the image input unit and the image output unit, as the image processing condition information. This enables the image processing control information (the input characteristic and the output characteristic information) to be readily obtained according to the information conversion table TBL1.

C. Third Embodiment

C-1. Structure of Image Processing Apparatus and Outline of Image Processing

Figure 15:
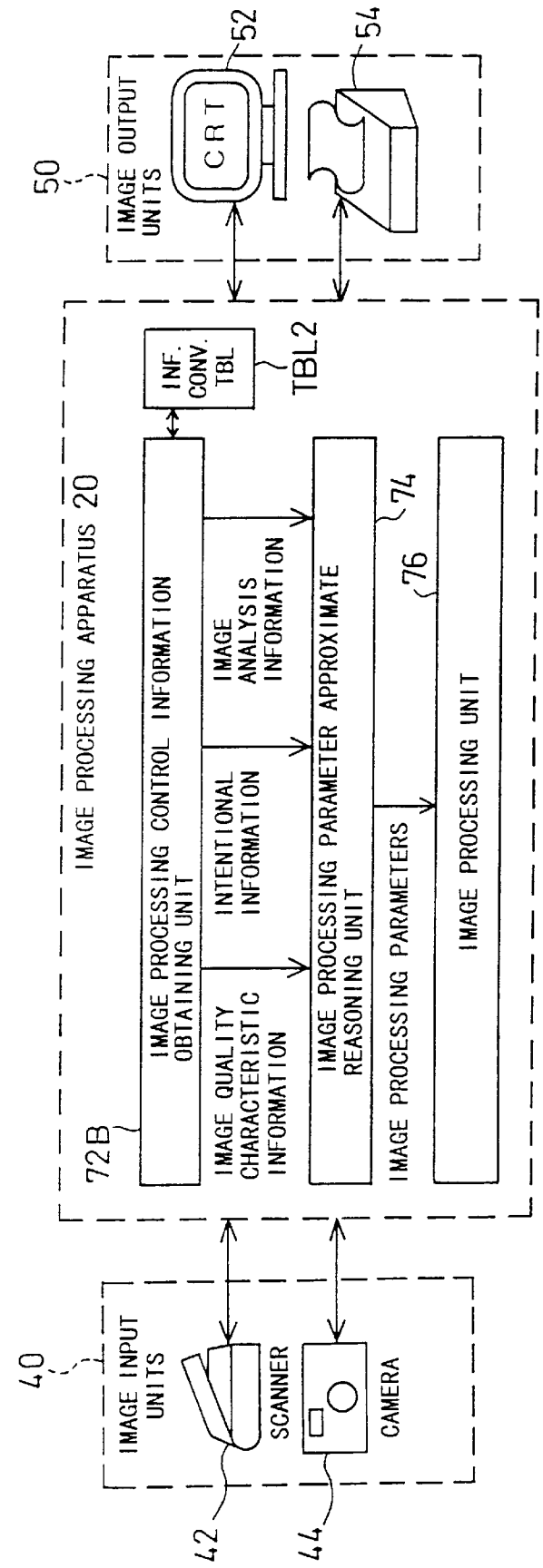
FIG. 15 is a block diagram illustrating the functional structure of still another image processing apparatus as a third embodiment of the present invention.

FIG. 15 is a bock diagram illustrating the functional structure of still another image processing apparatus as a third embodiment of the present invention. The image processing apparatus 20B of the third embodiment has a similar structure to that of the image processing apparatus 20A of the second embodiment shown in FIG. 13. The various computer programs cause the CPU 24 (see FIG. 1) to function as an image processing control information obtaining unit 72B, the image processing parameter approximate reasoning unit 74, and the image processing control unit 76 in the course of the respective processing stages. The image processing apparatus 20B has an information conversion table TBL2 which will be discussed later.

The difference between the second and third embodiments is that the image processing control information obtained by the image processing control information obtaining unit 72B of the third embodiment is not the input characteristic information of the image input unit or the output characteristic information of the image output unit but image quality characteristic information. The image processing apparatus 20B obtains the image quality characteristic information as the image processing control information according to the information conversion table TBL2.

Figure 16:
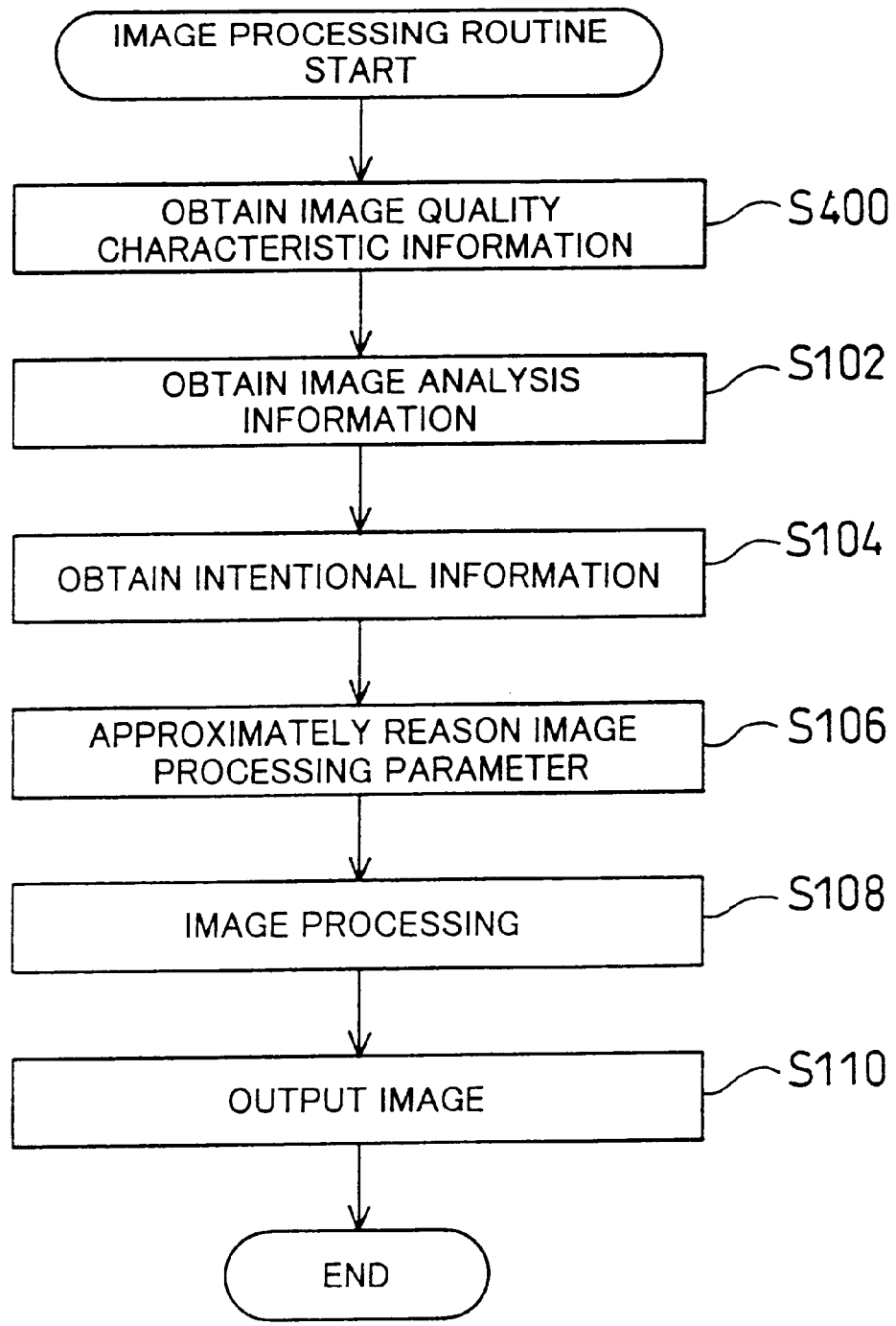
FIG. 16 is a flowchart showing the outline of an image processing routine executed in the third embodiment.

FIG. 16 is a flowchart showing the outline of an image processing routine executed in the third embodiment. At step S400, the image processing control information obtaining unit 72B (see FIG. 15) obtains the image quality characteristic information as the image processing control information. The contents of the image quality characteristic information will be described later. The processing of steps S102 through S110 of FIG. 16 is similar to the processing of the first embodiment shown in FIG. 3. The third embodiment, however, applies different fuzzy rules from those of the first embodiment as will be discussed later.

C-2. Process of Obtaining Image Quality Characteristic Information

Figure 17:
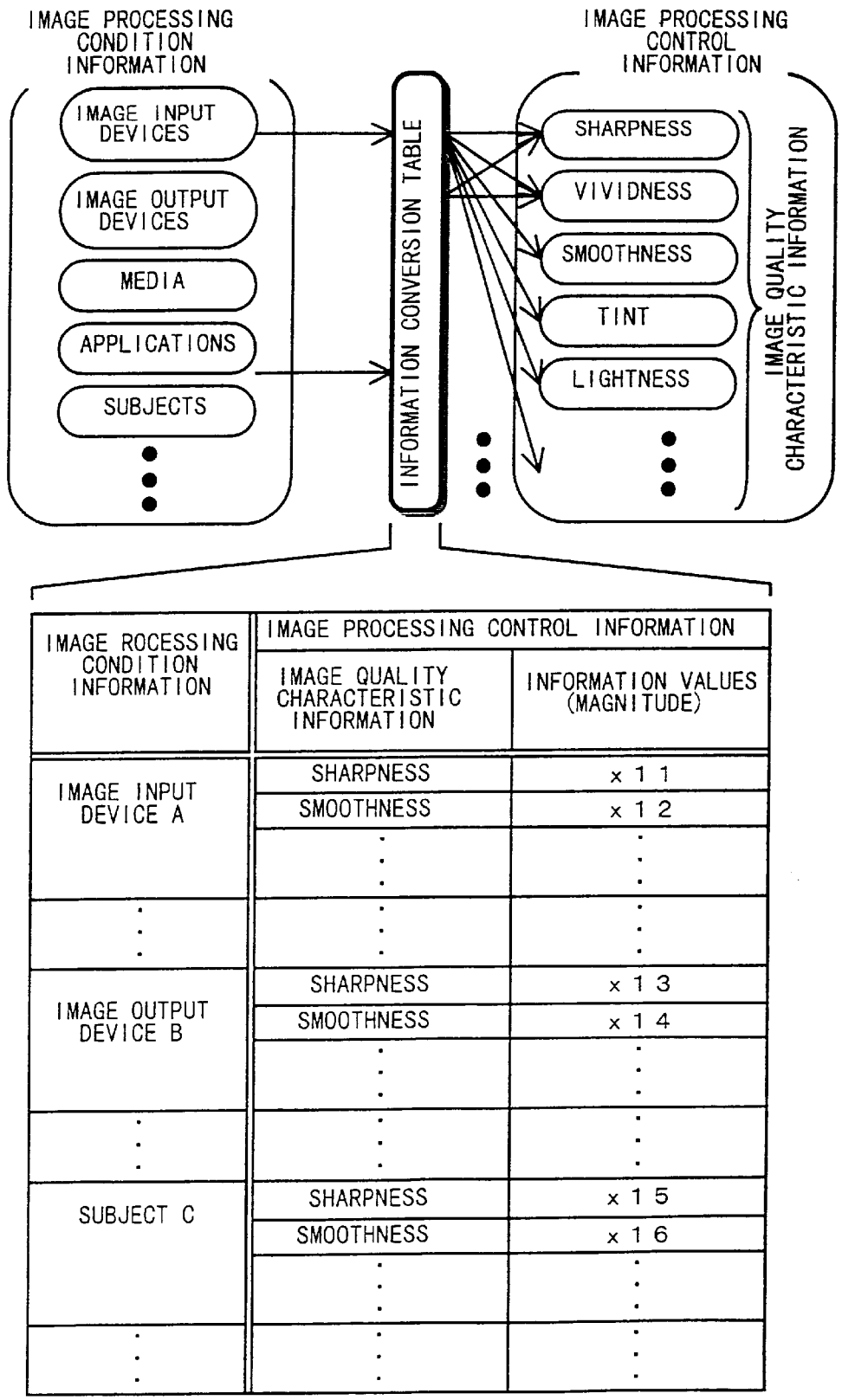
FIG. 17 shows how an image processing control information obtaining unit 72B obtains image quality characteristic information as image processing control information.

FIG. 17 shows how an image processing control information obtaining unit 72B obtains image quality characteristic information as image processing control information. The information conversion table TBL2 stores the relationship between the image processing condition information and the corresponding image quality characteristic information. Here, the term 'image processing condition information' implies pieces of information that affect the quality of the output image. The image processing condition information includes information (for example, names and models) regarding the image input unit (the image input devices), such as a scanner and a digital camera; information (for example, names and models) regarding the image output unit (the image output devices), such as a laser printer, an ink jet printer, and a CRT; information regarding the output media, such as plain paper, regenerated paper, and special paper; information regarding the applications of the image, such as posters and leaflets; and information regarding the subjects of the image, such as portraits and landscapes. The term 'image quality characteristic information' denotes pieces of information that represent the results of the image processing determined empirically corresponding to the image processing condition information. The image quality characteristic information is expressed by descriptive keywords. The image quality characteristic information includes, for example, information regarding the vividness, sharpness, texture, and tint of the output image, each expressed by descriptive keywords.

The image quality characteristic information is related to the image processing parameters. By way of example, the pieces of the image quality characteristic information 'intensity of sharpness', 'texture of the image', and 'smoothness of the image' are related respectively to the image processing parameters 'sharpness gain', 'mask size', and 'graininess'.

In the information conversion table TBL2, each piece of the image processing condition information is related to a set of preferred information values corresponding to a plurality of pieces of the image quality characteristic information. For example, the image processing condition information 'image input device A' is related to the pieces of the image quality characteristic information 'sharpness X11' and 'smoothness X12'. The information conversion table TBL2 is stored in the RAM 28, the hard disk 34, or the like shown in FIG. 1.

The user specifies the image processing condition information including an image input device, an image output device, an output medium, and an application, for example, through the operation of the keyboard 30, when setting up or starting the image processing apparatus 20B. Initial settings may be adopted for some image processing conditions. When the image processing starts, the image processing condition information obtaining unit 72B reads the specified pieces of information as the image processing condition information, refers to the information conversation table TBL2, and obtains the image quality characteristic information corresponding to the image processing condition information.

C-4. Approximation of Image Processing Parameters

At step S106, the image processing parameter approximating unit 74 (see FIG. 15) approximates image processing parameters based on the respective pieces of the image processing control information obtained at steps S400, S102, and S104.

The following describes an example procedure for approximating the image processing parameters. In the example discussed below, an image input device 'digital camera N1', an image output device 'dye sublimation printer N2', and an image subject 'portrait' are specified as the image processing condition information. The procedure determines a plurality of image processing parameters in the sharpness enhancement operation, that is, the sharpness gain (the parameter for regulating the intensity of an indistinct mask), the mask size (the parameter for regulating the cut-off frequency of the indistinct mask), and the graininess (the parameter for regulating the non-sensitive band of the unsharp mask), using fuzzy logic.

The image quality characteristic information relating to the sharpness enhancement operation includes 'intensity of sharpness', 'texture of the image', and 'smoothness of the image'. These pieces of the image quality characteristic information are respectively related to the control of the sharpness gain, the mask size, and the graininess. In the information conversion table TBL2, the intensity of the sharpness, the texture of the image, and the smoothness of the image are related to corresponding pieces of the image processing condition information.

FIG. 18 shows examples of image processing condition information and the image quality characteristic information as the image processing control information representing the sharpness of the image. In the information conversion table TBL2, corresponding pieces of the image quality characteristic information representing the sharpness of the image are related to the respective pieces of the image processing condition information, that is, the image input device 'digital camera N1', the image output device 'dye sublimation printer N2', and the subject of the image 'portrait'. The information values of the respective pieces of the image quality characteristic information are given as scalable values empirically determined by taking into account the effects of the image quality characteristic information corresponding to the respective pieces of the image processing condition information on the resulting image. In this embodiment, the information values of the respective pieces of the image quality characteristic information are given in the range of 0 through 100, based on the following conditions.

(1) The intensity of the sharpness is set equal to 40 and the smoothness of the image equal to 70, based on the following condition relating to the image input device 'digital camera N1': 'Since some sharpness enhancement operation has already been carried out in the digital camera N1, the degree of the further sharpness enhancement should be modest. Because of a narrow dynamic range, a smooth finish is desirable, in order to prevent roughness in the resulting image.'

(2) The intensity of the sharpness is set equal to 60 and the texture of the image equal to 30, based on the following condition relating to the image output device 'dye sublimation printer N2': 'A fine finish is desirable since the resolution power is 300 dpi and the tone expression is continuous. Because of the unclear edges that are characteristic of a sublimation transfer printer, the degree of sharpness enhancement should be relatively high.'

(3) The intensity of the sharpness is set equal to 30, the texture of the image equal to 50, and the smoothness of the image equal to 65, based on the following condition relating to the subject of the image as a 'portrait': 'The degree of sharpness enhancement should be modest. A soft touch is desirable for the skin in the portrait. The texture should be standard.'

It is assumed here that the specific pieces of the image quality characteristic information shown in the table of FIG. 18 are obtained as the image processing condition information at step S400 in the flowchart of FIG. 16. For clarity of explanation, the image analysis information and the information respectively obtained at steps S102 and S104 are not specifically described here.

As discussed in reference to the first embodiment, in order to carry out the approximation by fuzzy logic, it is required to define the fuzzy rules that map the respective pieces of the image processing control information or more specifically the image quality characteristic information to the corresponding pieces of the image processing parameters. FIGS. 19(a) through 19(c) show examples of the fuzzy rules relating to the image processing parameters used in the sharpness enhancement operation of the third embodiment. FIG. 19(a) shows an example of the fuzzy rules relating to the image processing parameter 'gain or sharpness gain' applied with respect to the intensity of the sharpness and specified as image quality characteristic information. FIG. 19(b) shows an example of the fuzzy rules relating the image processing parameter 'mask size' applied with respect to the texture of the image and specified as image quality characteristic information. FIG. 19(c) shows an example of the fuzzy rules relating to the image processing parameter 'graininess' applied with respect to the smoothness of the image and specified as image quality characteristic information. Although simple rules are shown in the examples of FIGS. 19(a) through 19(c) for clarity of explanation, the fuzzy rules are determined empirically according to the circumstances in the actual application.

As described in the first embodiment, it is also required to define membership functions regarding the image quality characteristic information as the antecedents of the fuzzy rules and membership functions regarding the image processing parameters as the consequents of the fuzzy rules as shown in FIGS. 20(a) through 20(f) discussed below.

Based on the conditions thus defined, the image processing parameter approximating unit 74 (see FIG. 15) approximates the image processing parameters using fuzzy logic. FIGS. 20(a) through 20(f) show examples of the fuzzy logic in the third embodiment. The abscissa of FIGS. 20(a) through 20(f) indicates either a piece of the image processing control information or an image processing parameter in the normalized scale, whereas the ordinate indicates the compatibility or the membership value.

The process of approximation by fuzzy logic in the third embodiment is identical with that discussed in the first embodiment with reference to the flowchart of FIG. 10. At step S200, membership values in the antecedents of the respective fuzzy rules are specified with respect to various pieces of image processing control information. In the example of FIG. 20(a), a membership value a1h in the fuzzy set NS and a membership value a1l in the fuzzy set ZO are specified corresponding to an information value a1=40 (see FIG. 18), determined for the image input device 'digital camera N1' as information on the intensity of the sharpness. A membership value a2h in the fuzzy set PS and a membership value a2l in the fuzzy set ZO are specified corresponding to an information value a2=60 (see FIG. 18), determined for the image output device 'dye sublimation printer N2'. A membership value a3h in the fuzzy set NM and a membership value a3l in the fuzzy set NS are specified corresponding to an information value a3=30 (see FIG. 18), determined for the image subject set as 'portrait'.

In the example of FIG. 20(b), the procedure uses the membership function in the antecedent regarding the texture of the image and specifies membership values b2h and b2l corresponding to an information value b2=30 (see FIG. 18), determined for the image output device 'dye sublimation printer N2', and a membership value b3h corresponding to an information value b3=50 (see FIG. 18), determined for the image subject 'portrait'. In the example of FIG. 20(c), the procedure uses the membership function in the antecedent regarding the smoothness of the image and specifies membership values c1h and c1l corresponding to an information value c1=70 (see FIG. 18), determined for the image input device 'digital camera N1', and membership values c3h and c3l corresponding to an information value c3=65, determined for the image subject 'portrait'.

At step S202 of FIG. 10, the approximation results are obtained with respect to each piece of the image processing control information or more specifically the image quality characteristic information, based on the fuzzy rules and the membership values corresponding to the piece of the image processing control information obtained at step S200. Approximation results are shown as fuzzy sets on the membership functions in the consequents, based on the membership values determined by the membership functions in the antecedents. By way of example, FIG. 20(d) shows the approximation results with respect to the intensity of the sharpness, that is, the sharpness gain as the image processing parameter. These results are based on the membership values a1h, a1l, a2h, a2l, a3h, and a3l obtained in FIG. 20(a) and the fuzzy rules shown in FIG. 19(a). The approximation results are shown by the shapes drawn by the thick solid lines and filled with the slant lines in FIG. 20(d). These shapes have apexes at the height of the given membership values and are contracted in the direction of the height of the fuzzy sets, which are drawn by the thin solid lines and specified by the consequents of the fuzzy rules shown in FIG. 20(a). Another method may be applied to express the approximation results on the membership functions in the consequents. For example, the fuzzy set may be truncated at the height of the membership value.

In a similar manner, FIG. 20(e) shows the approximation results with respect to the texture of the image, that is, the mask size as the image processing parameter. FIG. 20(f) shows the approximation results with respect to the smoothness of the image, that is, the graininess as the image processing parameter.

At subsequent step S204, a final approximation result with respect to each image processing parameter is obtained from the approximation results specified at step S202 for the respective pieces of the image processing information, or more specifically, the image quality characteristic information. As discussed in connection with the first embodiment, an example of step S204 superposes the respective approximation results, which are obtained at step S202 corresponding to the respective membership values, obtains a union of the fuzzy sets by combining the maximums of the results, and computes the barycenter in the union of the fuzzy sets. The barycenter is calculated according to Equation (1) given before.

The values on the abscissa corresponding to the barycenter in FIGS. 20(d), 20(e), and 20(f), that is, the values of the sharpness gain, the mask size, and the graininess, are specified as the final approximation results.

The image processing unit 76 then carries out the image processing operation with the values of the sharpness gain, obtained as the final approximation results at step S108. The resulting image with the desired sharpness enhancement is finally output from the color printer 54 of FIG. 2 at step S110. The final approximation result may be the maximum or the minimum in the union of the fuzzy sets, instead of the barycenter.

As discussed in connection with the first embodiment with the flowchart of FIG. 12, the third embodiment may also adopt additional fuzzy logic that approximates the deviations from the reference image processing parameter.

Like in the first embodiment, in the arrangement of the third embodiment, approximation of each image processing parameter used in the image processing operation enables the resulting value of the image processing parameter to be a compromise among the values of the image processing parameter specified for the respective pieces of the image processing control information. This leads to the appropriate image processing operation. Approximation of the image processing parameters based on the various pieces of image processing control information allows even an unskilled operator who is unfamiliar with the process of setting the image processing parameters to carry out appropriate image processing and obtain the output of a desired image simply by specifying information about the desired features of the resulting image as specified information. The arrangement of the third embodiment uses the information conversion table that converts the image processing condition information into the image quality characteristic information. When the user simply specifies required pieces of the image processing condition information, the information conversion table converts the specified pieces of the image processing condition information into the corresponding pieces of the image quality characteristic information. The image processing parameters are then approximated corresponding to the converted pieces of the image quality characteristic information.

The image processing condition information includes simple pieces of information, such as the image input device, the image output device, and the type of paper. The respective pieces of the image quality characteristic information are descriptive information that are related to the image processing parameters and represent the quality of the resulting image. Compared with the first embodiment, this arrangement of the third embodiment further facilitates appropriate image processing by an unskilled operator who is unfamiliar with the process of setting the image processing parameters.

In the first embodiment, the image processing control information includes several pieces of characteristic information that are characteristic of the image input device and the image output device. It is accordingly required to provide the fuzzy rules used for the approximating and the membership functions in the antecedent and in the consequent (referred to as the parameter setting), with respect to each piece of characteristic information. In the third embodiment, on the other hand, the image processing control information includes several pieces of the image quality characteristic information corresponding to the respective image processing parameters, such as information representing the vividness of the image, information representing the sharpness of the image, and information representing the smoothness of the image. Even when the user changes the image processing condition information, such as the image input device, the image output device, or the type of output media, the arrangement of the third embodiment does not require a change to the parameter settings. When the user adds new pieces of image processing condition information, for example, new image input devices and image output devices, or changes the existing image processing condition information, this arrangement only requires supplementing and/or modifying the information conversion table.

Figure 21:
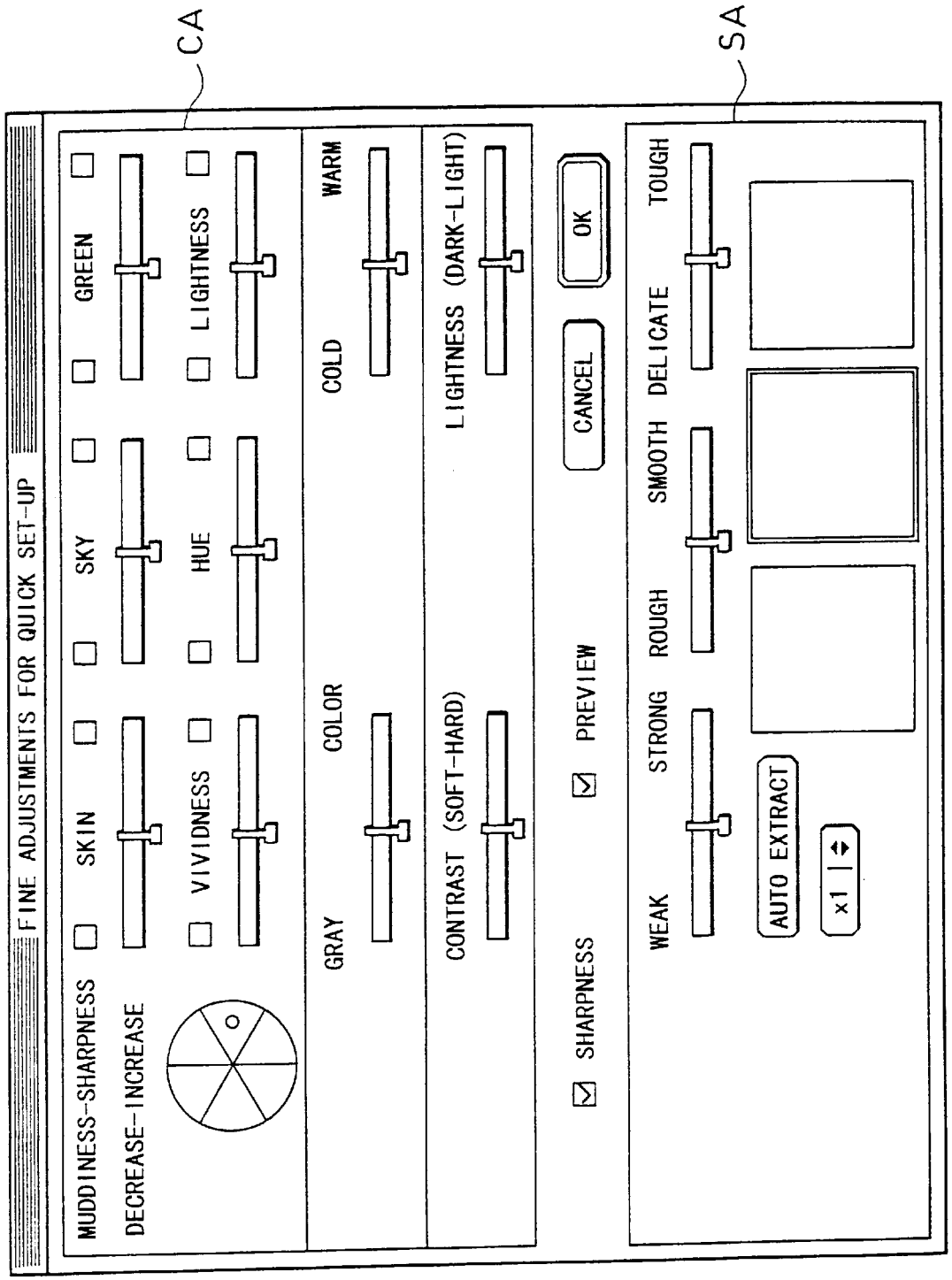
FIG. 21 shows a window for adjusting an image.

For clarity of explanation, the image analysis information and the information specified by the operator and any other person, which are also included in the image processing control information, are omitted from the description of the third embodiment regarding the process of approximating the image processing parameters. As described in connection with the first embodiment, however, the procedure of the third embodiment also approximates the image processing parameters based on the image analysis information and the information specified by the operator and any other person inputted as image processing control information. The information specified by the operator and another person may be specified, for example, on a window for adjusting an image shown in FIG. 21. Various setting levers for color adjustment of the image are provided in a color adjustment box CA shown in the upper half of FIG. 21. Various setting levers for adjustment of the sharpness are provided in a sharpness adjustment box SA shown in the lower half of FIG. 21. The user sets these levers at desired positions, thereby specifying the desired tint of the image and the desired sharpness.

D. Other Embodiments and Their Modifications

The present invention is not restricted to the above embodiments or their modifications, but there may be many other modifications, changes, and alterations without departing from the scope or spirit of the main characteristics of the present invention. Some possible examples of modification are given below.

(1) The above embodiments are described with reference to the sharpness enhancement operation as an example of the image processing operation. The principle of the present invention is, however, not restricted to the sharpness enhancement operation but is applicable to a variety of image processing operations, such as tone change and color conversion, based on the corresponding pieces of image processing control information.

(2) The image processing control information described in the above embodiments are only typical examples and are not restrictive of the present invention. In the actual image processing operation, the required pieces of the image processing control information are selectively used. For example, the principle of the present invention is applicable to a case which utilizes only the input characteristic information and the output characteristic information, a case which does not utilize image analysis information, a case which does not utilize operator-specified information, and a case which does not utilize input characteristic information in the structure of the first embodiment discussed above.

(3) In the above embodiments, the specified information is given in a functional or qualitative form of expression (perceivable form of expression). In some cases, a plurality of operators may commonly use one image processing apparatus. The respective operators have different understandings of the qualitative expressions of the specified information. The degree of difference is here referred to as taste information.

The taste information of the respective operators with respect to various pieces of specified information may be registered in advance in the form of a table. In this case, the current operator is specified through operation of the keyboard 30 when starting the operation of the image processing apparatus 20. When the operator specifies 'slightly sharp' as the specified information regarding the sharpness through operation for the keyboard 30, the taste information of the current operator with respect to the specified information 'slightly sharp' is read from the table. The corrected information reflecting the taste of the current operator is then output to the image processing parameter approximating unit 74. The image processing parameter approximating unit 74 approximates the image processing parameter based on the corrected information and the other pieces of image processing control information.

In the above arrangement, taste information of the respective operators is specified for each piece of intentional information. Another modified arrangement, however, specifies taste information independently from the specified information. In this case, taste information representing the general taste of each operator is registered in the form of a table. When the current operator is specified through operation of the keyboard 30, the outputs of the table prepared for the current operator are given as one determinant of the image processing parameter to the image processing parameter approximating unit 74 until another operator is specified.

Both of the above arrangements can effectively prevent variation in output image due to differences in tastes of image processing among the respective operators.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of processing image data of an input image obtained by an image input device connected with an image processing unit, in order to enable an output image generated by an image output device connected with the image processing unit to have a desired image quality, the method comprising the steps of:

(a) obtaining appropriate information from among input characteristic information relating to characteristics of a variety of image input devices connectable with the image processing unit and affecting images obtained by the variety of image input devices, and from among output characteristic information relating to characteristics of a variety of image output devices connectable with the image processing unit and affecting images output by the variety of image output devices, the obtained input characteristic information and output characteristic information serving as image processing control information to determine at least one image processing parameter used for processing the input image to attain the desired image quality, the obtained input characteristic information providing information regarding the image input device connected with the image processing unit, and the obtained output characteristic information providing information regarding the image output device connected with the image processing unit;

(b) determining the at least one image processing parameter based on the image processing control information; and (c) processing the image data of the input image according to the at least one image processing parameter, so as to generate the output image having the desired image quality.

2. A method in accordance with claim 1, wherein the step (a) comprises the step of:

obtaining information representing statistically processed results of the input image as one piece of the image processing control information.

3. A method in accordance with claim 1, wherein the step (a) comprises the step of:

obtaining specified information as one piece of the image processing control information, the specified information representing a requirement of an operator with respect to the desired image quality.

4. A method in accordance with claim 3, the method further comprising the step of:

providing preference information of a plurality of operators, each piece of the preference information representing a deviation of the specified information with respect to each of the plurality of operators from a reference image quality, wherein the step (a) comprises the step of obtaining the preference information as one piece of the image processing control information according to a specification by an operator who currently operates the image processing unit.

5. A method in accordance with claim 1, wherein the step (b) comprises the step of:

determining the at least one image parameter based on the image processing control information according to fuzzy logic.

6. An image processing apparatus that processes image data of an input image obtained by an image input device connected with the image processing unit, in order to enable an output image generated by an image output device connected with the image processing unit to have a desired image quality, the image processing apparatus comprising:

an image processing control information obtaining unit that obtains appropriate information from among input characteristic information relating to characteristics of a variety of image input devices connectable with the image processing unit and affecting images obtained by the variety of image input devices, and from among output characteristic information relating to characteristics of a variety of image output devices connectable with the image processing unit and affecting images output by the variety of image output devices, the obtained input characteristic information and output characteristic information serving as image processing control information to determine at least one image processing parameter used for processing the input image to attain the desired image quality, the obtained input characteristic information providing information regarding the image input device connected with the image processing unit, and the obtained output characteristic information providing information regarding the image output device connected with the image processing unit;

an image processing parameter determining unit that determines the at least one image processing parameter based on the image processing control information; and an image processing unit that processes the image data of the input image according to the at least one image processing parameter, so as to generate the output image having the desired image quality.

7. An image processing apparatus in accordance with claim 6, wherein the image processing control information obtaining unit comprises:

a unit that obtains representing statistically processed results information of the input image as one piece of the image processing control information.

8. An image processing apparatus in accordance with claim 6, wherein the image processing control information obtaining unit comprises:

a unit that obtains specified information as one piece of the image processing control information, the specified information representing a requirement of an operator with respect to the desired image quality.

9. An image processing apparatus in accordance with claim 8, the image processing apparatus further comprising:

a unit that provides preference information of a plurality of operators, each piece of the preference information representing a deviation of specified information with respect to each of the plurality of operators from a reference image quality, wherein the image processing control information obtaaing unit comprises a unit that obtains the preference information as one piece of the image processing control information according to a specification by an operator who currently operates the image processing apparatus.

10. An image processing apparatus in accordance with claim 6, wherein the image processing parameter determining unit determines the at least one image parameter based on the image processing control information according to fuzzy logic.

11. A computer program product for processing image data of an input image obtained by an image input device connected with a computer, in order to enable an output image generated by an image output device connected with the computer to have a desired image quality, the computer program product comprising:

a computer readable medium;

a first program code unit that causes the computer to obtain appropriate information from among input characteristic information relating to characteristics of a variety of image input devices connectable with the image processing unit and affecting images obtained by the variety of image input devices, and from among output characteristic information relating to characteristics of a variety of image output devices connectable with the image processing unit and affecting images output by the variety of image output devices, the obtained input characteristic information and output characteristic information serving as image processing control information to determine at least one image processing parameter used for processing the input image to attain the desired image quality, the obtained input characteristic information desired image quality, the obtained input characteristic information providing information regarding the image input device connected with the computer, and the obtained output characteristic information providing information regarding the image output device connected with the computer;

a second program code unit that causes the computer to determine the at least one image processing parameter based on the image processing control information; and a third program code unit that causes the computer to process the image data of the input image according to the at least one image processing parameter, so as to generate the output image having the desired image quality;

wherein each of the program code units is recorded on the computer readable medium.

12. A method of processing image data of in input image obtained by an image input device connected with an image processing unit, in order to enable an output image generated by an image output device connected with the image processing unit to have a desired image quality, the method comprising the steps of:

(a) providing an image processing determining unit that determines an image processing parameter required for image processing by the image processing unit;

(b) providing an information conversion table that correlates image processing condition information with corresponding image processing control information, the image processing condition information affecting the image quality of the output image, the image processing control information being used to determine the at least one image processing parameter and scalable so as to be inputted into the image processing determining unit;

(c) determining the at least one image processing parameter based on the image processing control information; and (d) processing the image data of the input image according to the at least one image processing parameter, so as to generate the output image having the desired image quality.

13. A method in accordance with claim 12, wherein the image processing condition information comprises at least one of information regarding the image input device; information regarding the image output device; information regarding an output medium; information regarding a use of the output image; and information regarding an object included in an image.

14. A method in accordance with claim 12, wherein the image processing control information comprises at least one of input characteristic information and output characteristic information, the input characteristic information providing information regarding the image input device connected to the image processing unit and affecting quality of the input image, the output characteristic information providing information regarding the image output device connected to the image processing unit and affecting quality of the output image.

15. A method in accordance with claim 12, wherein the image processing control information comprises image quality characteristic information that affects the image quality of the output image and is related to the image processing parameter.

16. A method in accordance with claim 15, wherein the image quality characteristic information comprises at least one of information regarding vividness of the output image; information regarding sharpness of the output image; information regarding smoothness of the output image; information regarding texture of the output image; information regarding contrast of the output image; and information regarding tint of the output image.

17. A method in accordance with claim 14, wherein the step (b) comprises the step of:

obtaining information representing statistically processed results of the input image as one piece of the image processing control information.

18. A method in accordance with claim 14, wherein the step (b) comprises the step of:

obtaining specified information as one piece of the image processing control information, the specified information representing a requirement of an operator with respect to the desired image quality.

19. A method in accordance with claim 18, the method further comprising the step of:

providing preference information of a plurality of operators, each piece of the preference information representing a deviation of the specified information with respect to each of the plurality of operators from a reference image quality, wherein the step (b) comprises the step of obtaining the preference information as one piece of the image processing control information according to a specification by an operator who currently operates the image processing unit.

20. A method in accordance with claim 12, wherein the step (c) comprises the step of:

determining the at least one image parameter based on the image processing control information according to fuzzy logic.

21. An image processing apparatus that processes image data of an input image obtained by an image input device connected with the image processing apparatus, in order to enable an output image generated by an image output device connected with the image processing apparatus to have a desired image quality, the image processing apparatus comprising:

an information conversion table the correlates image processing condition information with corresponding image processing control information, the image processing condition information affecting the image quality of the output image, the image processing control information being used to determine at least one image processing parameter;

an image processing control information obtaining unit that obtains at least one piece of the image processing condition information and correlates the at least one piece of the image processing condition information into at least one corresponding piece of the image processing control information;

an image processing parameter determining unit that determines the at least one image processing parameter based on the image processing control information; and an image processing unit that processes the image data of the input image according to the at least one image processing parameter, so as to generate the output image having the desired image quality.

22. An image processing apparatus in accordance with claim 21, wherein the image processing condition information comprises at least one of: information representing the image input device; information representing the image output device; information representing an output medium; information representing a use of the output image; and information representing an object included in an image.

23. An image processing apparatus in accordance with claim 21, wherein the image processing control information comprises at least one of input characteristic information and output characteristic information, the input characteristic information being characteristic of the image input device and affecting quality of the input image, the output characteristic information being characteristic of the image output device and affecting quality of the output image.

24. An image processing apparatus in accordance with claim 21, wherein the image processing control information comprises image quality characteristic information that represents image quality of an output image and is related to the image processing parameter.

25. An image processing apparatus in accordance with claim 24, wherein the image quality characteristic information comprises at least one of information regarding vividness of the output image; information regarding sharpness of the output image; information regarding smoothness of the output image; information regarding texture of the output image; information regarding contrast of the output image; and information regarding tint of the output image.

26. An image processing apparatus in accordance with claim 23, wherein the image processing control information obtaining unit comprises:

a unit that obtains information representing statistically processed results of the input image as one piece of the image processing control information.

27. An image processing apparatus in accordance with claim 23, wherein the image processing control information obtaining unit comprises:

a unit that obtains specified information as one piece of the image processing control information, the specified information representing a requirement of an operator with respect to the desired image quality.

28. An image processing apparatus in accordance with claim 27, the image processing apparatus further comprising:

a unit the provides preference information of a plurality of operators, each piece of the preference information representing a deviation of the specified information with respect to each of the plurality of operators from a reference image quality, wherein the image processing control information obtaining unit comprises a unit that obtains the preference information as one piece of the image processing control information according to a specification by an operator who currently operates the image processing apparatus.

29. An image processing apparatus in accordance with claim 21, wherein the image processing parameter determining unit determines the at least one image parameter based on the image processing control information using fuzzy logic.

30. A computer program product for processing image data of an input image obtained by an image input device connected with a computer, in order to enable an output image generated by an image output device connected with the computer to have a desired image quality, the computer program product comprising:

a computer readable medium;

a first program code unit that causes the computer to provide an information conversion table that correlates image processing condition information into corresponding image processing control information, the image processing condition information affecting the image quality of the output image, the image processing control information being used to determine at least one image processing parameter;

a second program code unit that causes the computer to obtain at least one piece of the image processing condition information and correlate the at least one piece of the image processing condition information into at least one corresponding piece of the image processing control information;

a third program code unit that causes the computer to determine the at least one image processing parameter based on the image processing control information; and a fourth program code unit that causes the computer to process the image data of the input image according to the at least one image processing parameter, so as to generate the output image having the desired image quality, wherein each of the program code units is recorded on the computer readable medium.

* * * * *